(12) United States Patent
Minami et al.

(10) Patent No.: US 11,797,551 B2
(45) Date of Patent: Oct. 24, 2023

(54) DOCUMENT RETRIEVAL APPARATUS, DOCUMENT RETRIEVAL SYSTEM, DOCUMENT RETRIEVAL PROGRAM, AND DOCUMENT RETRIEVAL METHOD

(71) Applicant: SHOWA DENKO K.K., Tokyo (JP)

(72) Inventors: Takuya Minami, Tokyo (JP); Yu Kawahara, Tokyo (JP); Shimpei Takemoto, Tokyo (JP); Eriko Takeda, Tokyo (JP); Yoshishige Okuno, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 343 days.

(21) Appl. No.: 17/310,439

(22) PCT Filed: Feb. 10, 2020

(86) PCT No.: PCT/JP2020/005167
§ 371 (c)(1),
(2) Date: Aug. 3, 2021

(87) PCT Pub. No.: WO2020/166569
PCT Pub. Date: Aug. 20, 2020

(65) Prior Publication Data
US 2022/0019581 A1 Jan. 20, 2022

(30) Foreign Application Priority Data
Feb. 14, 2019 (JP) .................................. 2019-024821

(51) Int. Cl.
*G06F 16/2458* (2019.01)
*G06F 16/93* (2019.01)
(Continued)

(52) U.S. Cl.
CPC .......... *G06F 16/2468* (2019.01); *G06F 16/93* (2019.01); *G06V 30/347* (2022.01); *G06V 30/416* (2022.01); *G06V 30/10* (2022.01)

(58) Field of Classification Search
None
See application file for complete search history.

(56) References Cited

U.S. PATENT DOCUMENTS 6,341,176 B1 1/2002 Shirasaki et al.
2002/0041713 A1* 4/2002 Imagawa ............. G06V 30/268
382/229

(Continued)

FOREIGN PATENT DOCUMENTS

JP H09-006920 1/1997
JP H10-027235 1/1998

(Continued)

OTHER PUBLICATIONS

International Search Report for PCT/JP2020/005167 dated Apr. 14, 2020.

*Primary Examiner* — Eddy Cheung
(74) *Attorney, Agent, or Firm* — IPUSA, PLLC

(57) ABSTRACT

A document retrieval apparatus includes a processor which receives an input of a keyword, acquires an author's name and a document file from a digital document database which stores document files of text data obtained by performing a character recognition process with respect to document image data of handwritten documents, and names of authors who wrote the handwritten documents, references an associating keyword database which stores information associating the authors' names, keywords, and associating keywords, to acquire an associating keyword of the input keyword, from the received input keyword and the acquired author's name, searches the acquired document file, using (Continued)

the input keyword and the acquired associating keyword, and outputs a search result of the searching.

20 Claims, 19 Drawing Sheets

(51) Int. Cl.
*G06V 30/10* (2022.01)
*G06V 30/32* (2022.01)
*G06V 30/416* (2022.01)

(56) References Cited

U.S. PATENT DOCUMENTS

2019/0108276 A1\* 4/2019 Kovács ................... G06F 16/20
2023/0229683 A1\* 7/2023 Minami .............. G06F 16/3334
707/722

FOREIGN PATENT DOCUMENTS

| JP | H10-207988 | | 8/1998 |
| JP | 2005-258577 | | 9/2005 |
| JP | 2012079159 A | \* | 4/2012 |
| JP | 2015-032017 | | 2/2015 |
| KR | 101800975 B1 | \* | 11/2017 |

\* cited by examiner

FIG.2

| HANDWRITTEN CHARACTER STRING | DIGITAL CHARACTER STRING | CORRECT CHARACTER STRING | TYPE |
|---|---|---|---|
| | レ行 | 飛行 | Simplified form |
| | 同題 | 問題 | Simplified form |
| | 1容1夜 | 溶液 | Running-form |
| | 石キ究 | 研究 | Old-style |
| | 暇説 | 仮説 | Old-style |

FIG.4

| DOCUMENT ID | DOCUMENT NAME | AUTHOR'S NAME | DOCUMENT FILE |
|---|---|---|---|
| 1 | Monthly Report_June 1960 | i | Monthly Report_June 1960 Text |
| 2 | Technical Report Year S55 | j | Technical Report Year S55 Text |
| ⋮ | ⋮ | ⋮ | ⋮ |
| ⋮ | ⋮ | ⋮ | ⋮ |

| AUTHOR'S NAME | KEYWORD | ASSOCIATING KEYWORD |
|---|---|---|
| i | 水酸化 | カ酸化 |
| j | 水酸化 | 氷酒化 |
| k | 水酸化 | 水酸化 |
| i | 黒鉛 | 黒鉛 |
| j | 黒鉛 | 黒金鉛 |
| ... | ... | ... |

| DOCUMENT ID | DOCUMENT NAME | DOCUMENT IMAGE DATA |
|---|---|---|
| 1 | Monthly Report_June 1960 | Monthly Report_June 1960.pdf |
| 2 | Technical Report Year S55 | Technical Report Year S55.pdf |
| ⋮ | ⋮ | ⋮ |
| ⋮ | ⋮ | ⋮ |

| AUTHOR'S NAME | KEYWORD | ASSOCIATING KEYWORD | SELECTION NUMBER |
|---|---|---|---|
| i | 水酸化 | 力酸化 | 10 |
| j | 水酸化 | 氷酒化 | 5 |
| k | 水酸化 | 水酸化 | 12 |
| i | 黒鉛 | 黒鉛 | 3 |
| j | 黒鉛 | 黒金슴 | 5 |
| ... | ... | ... | ... |

220A
122
123
121

DOCUMENT RETRIEVAL APPARATUS, DOCUMENT RETRIEVAL SYSTEM, DOCUMENT RETRIEVAL PROGRAM, AND DOCUMENT RETRIEVAL METHOD

TECHNICAL FIELD

The present invention relates to document retrieval apparatuses, document retrieval systems, document retrieval programs, and document retrieval methods.

BACKGROUND ART

Technical documents, created during technical development in an era centered around the high economic growth period, include handwritten documents on paper media. These handwritten technical documents are a treasure house of technology and know-how, and may be used to solve the technical problems currently being faced. However, in the form of paper documents, there are problems in that the accumulated technical documents are not utilized sufficiently due to difficulties, such as the time required to collect the paper documents for warehousing, the effort required to obtain target technical information because of the need to check the paper documents by turning over the pages one by one, or the like.

On the other hand, in recent years, character information included in the paper documents or the like is converted into image data by an optical reading device or the like, as electronic data, the image data is subjected to an optical character recognition (OCR) process to extract character information included in the image data, as character data, and the character information is converted into electronic files. There are increased demands to also convert the handwritten technical documents described above into the electronic files, to enable quick retrieval, browsing, or the like.

The accuracy of character recognition with respect to the handwritten technical documents cannot be said as being sufficient using the current technology, and there is active research to improve the recognition accuracy. For example, Patent Document 1 discloses a technique for increasing the recognition rate of handwritten characters by combining voice information. Patent Document 2 discloses a technique for increasing the character recognition rate by accurately extracting characters when performing the character recognition of handwritten character data input continuously without pausing.

PRIOR ART DOCUMENTS

Patent Documents

Patent Document 1: Japanese Laid-Open Patent Publication No. 2005-258577
Patent Document 2: Japanese Laid-Open Patent Publication No. H09-6920

DISCLOSURE OF THE INVENTION

Problem to be Solved by the Invention

The accuracy of the character recognition of handwritten documents remains insufficient, and in digital document data obtained as a result of the character recognition of the handwritten documents, defects and erroneous recognition of the characters exist. For this reason, even if a keyword search is performed with respect to the digital document data, the keyword search may not function properly, and it is difficult to quickly retrieve and browse the desired handwritten document.

One of the reasons for the insufficient accuracy of the character recognition of the handwritten documents is that the shape of the handwritten characters varies according to the handwriting or the like of each person who writes the handwritten documents. Because the handwriting or the like of the characters is unique to the person writing the handwritten documents, similar erroneous recognitions may occur repeatedly with the handwritten documents written by the same person.

The present invention was conceived to solve the problem described above, and one object of the present invention is to improve a hit rate of the keyword search.

Means of Solving the Problem

The present invention includes the following configurations.

[1] A document retrieval apparatus comprising:
an input reception unit configured to receive an input of a keyword;
a document acquisition unit configured to acquire an author's name and a document file from a digital document database which stores document files of text data obtained by performing a character recognition process with respect to document image data of handwritten documents, and names of authors who wrote the handwritten documents;
a keyword acquisition unit configured to reference an associating keyword database which stores information associating the authors' names, keywords, and associating keywords, and acquire an associating keyword of the input keyword, from the input keyword received by the input reception unit and the author's name acquired by the document acquisition unit;
a document search unit configured to search the document file acquired by the document acquisition unit, using the input keyword and the acquired associating keyword; and
a search result output unit configured to output a search result of the document search unit.

[2] The document retrieval apparatus recited in [1], further comprising:
a document image database which stores the document image data of the handwritten documents; and
a document image output unit configured to acquire and output a document file and associated document image data, from the document image database,
wherein the search result output unit outputs text data including the input keyword or the associating keyword, from the document file, as the search result, and
wherein, when a part of the text data is selected, the document image output unit acquires and outputs document image data associated with a document file including the selected part of the text data.

[3] The document retrieval apparatus recited in [1] or [2], wherein
the document search unit performs a fuzzy search using each of the input keyword and the associating keyword, and
the search result output unit includes a result of the fuzzy search in the search result.

[4] The document retrieval apparatus recited in [2] or [3], wherein
  information stored in the associating keyword database includes the associating keyword or a keyword regarded as a search keyword of the fuzzy search, the author's name acquired by the document acquisition unit, the keyword received by the input reception unit, and a selection number,
  and further comprising:
    an associating keyword update unit configured to update the selection number and store the updated selection number in the associating keyword database, when the part of the text data output as a result of the search using the associating keyword or the fuzzy search is selected from the search result.

[5] The document retrieval apparatus recited in any one of [1] to [4], further comprising:
  a prediction model learning unit configured to learn a prediction model; and
  a model storage unit configured to store the prediction model,
  wherein the prediction model learning unit causes the prediction model to learn using the information stored in the associating keyword database as learning data, and the model storage unit stores the learned prediction model,
  wherein the learned prediction model predicts and outputs an associating keyword when the input keyword and the acquired author's name are input, and
  wherein the document search unit searches the document file acquired by the document acquisition unit, using the input keyword and the predicted associating keyword.

[6] The document retrieval apparatus recited in [4], further comprising:
  a prediction model learning unit configured to learn a prediction model; and
  a model storage unit configured to store the prediction model,
  wherein the prediction model learning unit causes the prediction model to learn using updated associating information stored by the associating keyword update unit as learning data, and the model storage unit stores the learned prediction model,
  wherein the learned prediction model predicts and outputs the associating keyword when the input keyword and the acquired author's name are input, and
  wherein the document search unit searches the document file acquired by the document acquisition unit, using the input keyword and the predicted associating keyword.

[7] The document retrieval apparatus recited in [6], wherein
  when the text data is selected from the search result, the prediction model learning unit holds associating information associating the keyword generated from the input keyword included in the selected text data, the author's name, and the input keywords,
  the prediction model learning unit causes the prediction model to learn using an associating information group, formed by the associating information, as the learning data,
  the model storage unit stores the learned prediction model,
  after the learned prediction model is stored in the model storage unit, the learned prediction model predicts and outputs an associating keyword when the input keyword and the acquired author's name are input, and
  the document search unit searches the document file acquired by the document acquisition unit, using the input keyword and the predicted associating keyword.

[8] The document retrieval apparatus recited in any one of [1] to [7], wherein the associating keyword is a character string including an erroneously recognized character as a result of performing the character recognition process with respect to the keyword associated with the associating keyword.

[9] A document retrieval system comprising a document retrieval apparatus, and a terminal device, wherein the document retrieval apparatus includes
  an input reception unit configured to receive an input of a keyword;
  a document acquisition unit configured to acquire an author's name and a document file from a digital document database which stores document files of text data obtained by performing a character recognition process with respect to document image data of handwritten documents, and names of authors who wrote the handwritten documents;
  a keyword acquisition unit configured to reference an associating keyword database which stores information associating the authors' names, keywords, and associating keywords, and acquire an associating keyword of the input keyword, from the input keyword received by the input reception unit and the author's name acquired by the document acquisition unit;
  a document search unit configured to search the document file acquired by the document acquisition unit, using the input keyword and the acquired associating keyword; and
  a search result output unit configured to output a search result of the document search unit.

[10] A document retrieval program which causes a computer to perform a process comprising:
  receiving an input of a keyword;
  acquiring an author's name and a document file from a digital document database which stores document files of text data obtained by performing a character recognition process with respect to document image data of handwritten documents, and names of authors who wrote the handwritten documents;
  referencing an associating keyword database which stores information associating the authors' names, keywords, and associating keywords, to acquire an associating keyword of the input keyword, from the received input keyword and the acquired author's name;
  searching the acquired document file, using the input keyword and the acquired associating keyword; and
  outputting a search result of the searching.

[11] A document retrieval method to be implemented by a computer which performs procedures comprising:
  receiving an input of a keyword;
  acquiring an author's name and a document file from a digital document database which stores document files of text data obtained by performing a character recognition process with respect to document image data of handwritten documents, and names of authors who wrote the handwritten documents;
  referencing an associating keyword database which stores information associating the authors' names, keywords, and associating keywords, to acquire an associating keyword of the input keyword, from the received input keyword and the acquired author's name;

searching the acquired document file, using the input keyword and the acquired associating keyword; and outputting a search result of the searching.

Effects of the Invention

It is possible to improve the hit rate of the keyword search.

BRIEF DESCRIPTION OF DRAWINGS

FIG. 2 is a diagram for explaining a retrieval process of the first embodiment.

FIG. 4 is a diagram illustrating an example of a digital document database according to the first embodiment.

FIG. 5 is a diagram illustrating an example of an associating keyword database according to the first embodiment.

FIG. 6 is a diagram illustrating an example of a document image database according to the first embodiment.

FIG. 12 is a diagram illustrating an example of the associating keyword database according to the second embodiment.

MODE OF CARRYING OUT THE INVENTION

First Embodiment

Figure 1:
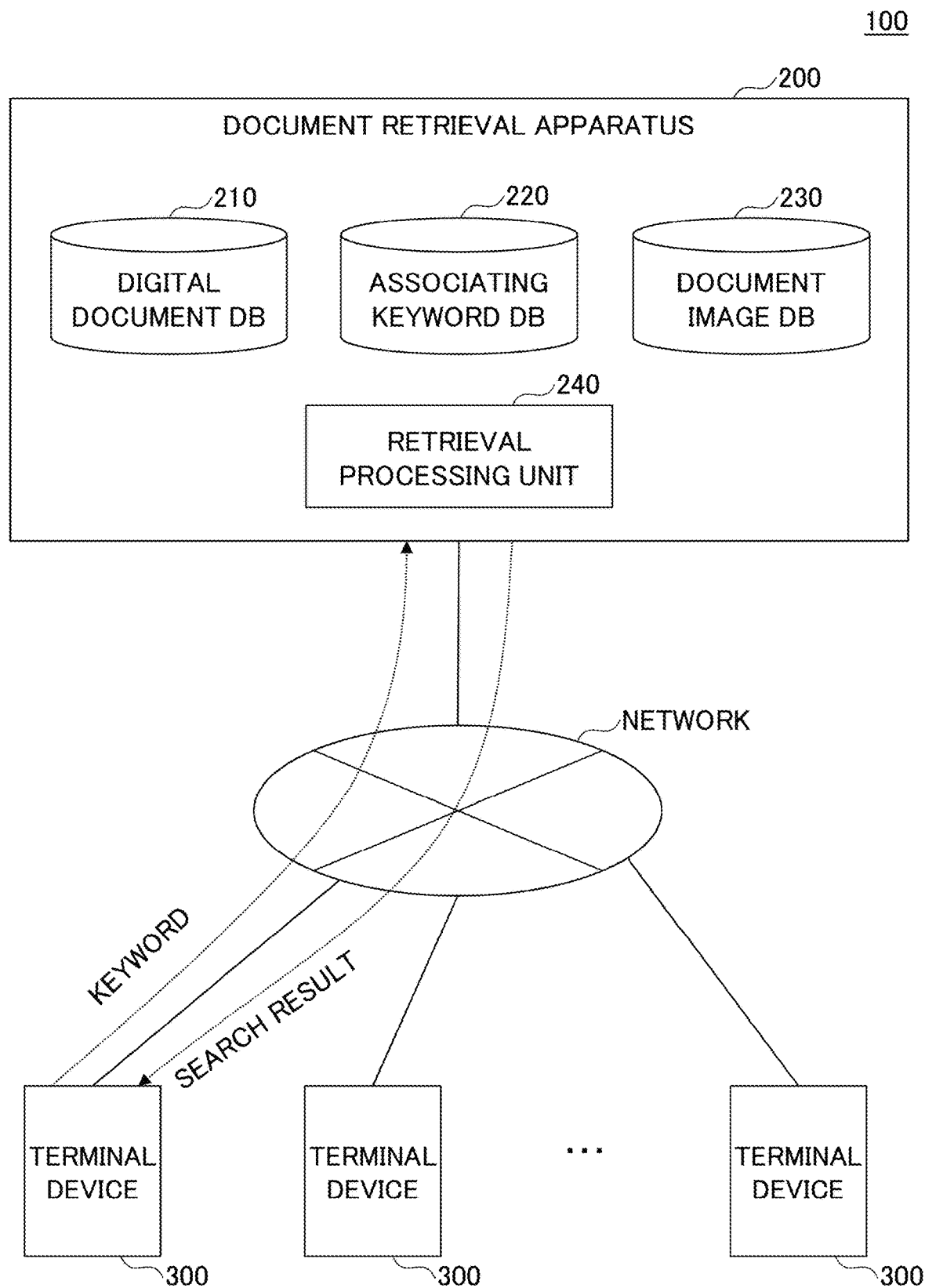
FIG. 1 is a diagram illustrating an example of a system configuration of a document retrieval system according to a first embodiment.

Hereinafter, a first embodiment will be described with reference to the drawings. FIG. 1 is a diagram illustrating an example of a system configuration of a document retrieval system according to the first embodiment.

The document retrieval system 100 according to this embodiment includes a document retrieval apparatus 200. The document retrieval system 100 further includes a terminal device 300, and the document retrieval apparatus 200 and the terminal device 300 may be connected via a network. The terminal device 300 includes an input device, such as a keyboard or the like, and an output device, such as a liquid crystal display or the like, in addition to a communication interface device or the like.

The document retrieval apparatus 200 according to this embodiment includes a digital document database 210, an associating keyword database 220, a document image database 230, and a retrieval processing unit 240.

The digital document database 210 stores digital document files (hereinafter also referred to as document files) including character information acquired by performing an OCR (Optical Character Recognition) process with respect to image data of paper documents stored in the document image database 230. Further, in the digital document database 210, the digital document files are stored in association with document names of the paper documents and names of persons who wrote the paper documents (hereinafter also referred to as authors' names).

The associating keyword database 220 stores associating information associating the authors' names of the paper documents that are sources of the images stored in the document image database 230, and character strings (treated as associating keywords, as will be described later) including erroneously recognized characters, and character strings (correct character strings, compared with input keywords and referenced, as will be described later) of correctly recognized characters, among the character strings written by the authors who wrote the characters or the like of the paper documents. An operation of storing the associating information associating the authors' names and the character strings, including the erroneously recognized characters, and the correct character strings, in the associating keyword database 220, and creating the associating keyword database 220, may be performed manually in advance. The characters or the like described above include numbers and symbols.

The document image database 230 stores image data of the paper documents read by an optical reading device or the like.

The paper documents refer to paper documents or the like that are handwritten, for example. Examples of the handwritten paper documents include technical documents in particular technical fields, including measurement recording paper or the like added with handwritten character information, such as design drawings, photographs, or the like including handwritten character information, such as lab notes, reports, or the like prepared by hand on paper media.

The paper documents may be printed paper documents or the like that are printed using printing type. The printed paper documents include technical documents in particular technical fields, including reports, design drawings, or the like printed on paper media using the printing type. Target paper documents may include a mixture of handwritten paper documents and printed paper documents. The "paper media" not only include paper, but may also include plastic films, cloths, boards, hides, walls, or the like.

The digital document database 210, the associating keyword database 220, and the document image database 230 according to this embodiment are prepared in advance, and provided in the document retrieval apparatus 200.

When the retrieval processing unit 240 according to this embodiment receives a keyword input from the terminal device 300, the input device 24 which will be described later, or the like, the retrieval processing unit 240 references the digital document database 210, and acquires the author's name of the person who wrote the characters or the like of the handwritten document, and the document file. Then, the retrieval processing unit 240 references the associating keyword database 220, and acquires an associating keyword associated with the keyword that is input and the author's name, based on the document file and the associated author's name. In the following description, the keyword that is input will be referred to as an input keyword.

Next, the retrieval processing unit 240 retrieves the document file included in the digital document database 210, using the acquired associating keyword and the input keyword, and outputs a search result to the terminal device 300. The retrieval processing unit 240 performs this process on all of the document files stored in the digital document database 210.

In other words, in addition to the retrieval from the digital document database 210 using the input keyword, the retrieval processing unit 240 according to this embodiment performs a retrieval from the digital document database 210 using the associating keyword, which is the character string including the erroneously recognized characters, and is also the character string to be referred to as the input keyword.

Next, processes of the retrieval processing unit 240 will be further described with reference to FIG. 2. FIG. 2 is a diagram for explaining a retrieval process of the first embodiment.

The shapes of the characters handwritten on the paper document may vary, even for the same character, according to the author's handwriting. More particularly, according to the author, a distance between Japanese Kanji character radicals called "hen" and "tsukuri" may be large, or old-style Japanese Kanji characters, simplified form of Japanese Kanji characters, running-form Japanese Kanji characters, or the like may be used, for example. In addition, an erroneous character may be written due to the author's prejudice.

If the distance between the Japanese Kanji character radicals called "hen" and "tsukuri" is large, the Japanese Kanji character radicals called "hen" and "tsukuri" may be recognized as separate characters, respectively. Moreover, the old-style Japanese Kanji characters, the running-form Japanese Kanji characters, or the like may be erroneously recognized as characters different from the characters intended by the author.

FIG. 2 illustrates a table associating the handwritten character strings written on the handwritten document, the digital character strings acquired by performing the OCR process on the handwritten character strings and performing the character recognition, the correct character strings intended by the handwritten character strings, and the types of handwriting of the handwritten characters.

In this table, the author, who wrote the correct character string "飛行" on the paper document, wrote the character "飛" using the simplified form of the Japanese Kanji character, for example. For this reason, the character recognition result of the handwritten character "飛" in the digital character string is "レ". Accordingly, it can be seen that the handwritten character string "飛行" of this author is erroneously recognized as a digital character string "レ行".

In addition, the author, who wrote the correct character string "問題" on the paper document, wrote the character "問" using the simplified form of the Japanese Kanji character, for example. For this reason, the character recognition result of the handwritten character "問" in the digital character string is "同". Accordingly, it can be seen that the handwritten character string "問題" of this author is erroneously recognized as a digital character string "同題".

Moreover, if the author, who wrote the correct character string "溶液", wrote the Japanese Kanji character radicals "hen" called "sanzui" in the running-form Japanese Kanji character, for example, the characters are erroneously recognized as a digital character string "1 容 1 夜". Further, if the author, who wrote the correct character string "研究", wrote the characters in the old-style Japanese Kanji characters, for example, the characters are erroneously recognized as a digital character string "石チキ究".

Accordingly, in the case of the handwritten documents, the erroneous recognition of the characters are caused by the author's writing (style of writing). This erroneous recognition is unique to the author, and thus, similar erroneous recognitions may occur repeatedly with the handwritten documents written by the same author.

Accordingly, this embodiment, the correct character strings and the digital character strings are associated with each other for each author, in advance, and stored in the associating keyword database 220.

For example, if the example illustrated in FIG. 2 is the result of the character recognition performed on the paper document written by a single author x, the associating keyword database 220 stores the associating information associating the author x, the correct character string "飛行", and the digital character string "レ行" which is the erroneously recognized result.

Similarly, the associating keyword database 220 stores the associating information associating the author x, the correct character string "問題", and the digital character string "同題" which is the erroneously recognized result.

When the input keyword "飛行" is input, for example, the retrieval processing unit 240 performs a search using the input keyword "飛行", and a search using an associating keyword "レ行", which is the digital character string associated with the input keyword "飛行", with respect to the document file.

In this embodiment, the retrieval process is performed using the character string (associating keyword) including the erroneously recognized characters of the handwritten characters, and the correct character string (input keyword) which is a word indicating the original meaning of the handwritten characters.

Accordingly, in the document file stored in the digital document database 210 according to this embodiment, even if the word matching the input keyword is incorrectly recognized during the OCR process, or if the original characters are correctly recognized but the original characters are incorrect to start with, for example, the possibility of extracting the document desired by the user who input the keyword increases, by performing the document retrieval using the associating keyword.

For this reason, according to this embodiment, it is possible to prevent erroneous detection, while increasing a hit rate of the keyword search.

In the example illustrated in FIG. 1, the digital document database 210, the associating keyword database 220, and the document image database 230 are provided in the document retrieval apparatus 200, however, the configuration is not limited thereto. Each of the digital document database 210, the associating keyword database 220, and the document image database 230 may be provided in an external apparatus communicable with the document retrieval apparatus 200. Further, parts of the digital document database 210, the associating keyword database 220, and the document image database 230 may be provided in the document retrieval apparatus 200.

Figure 3:
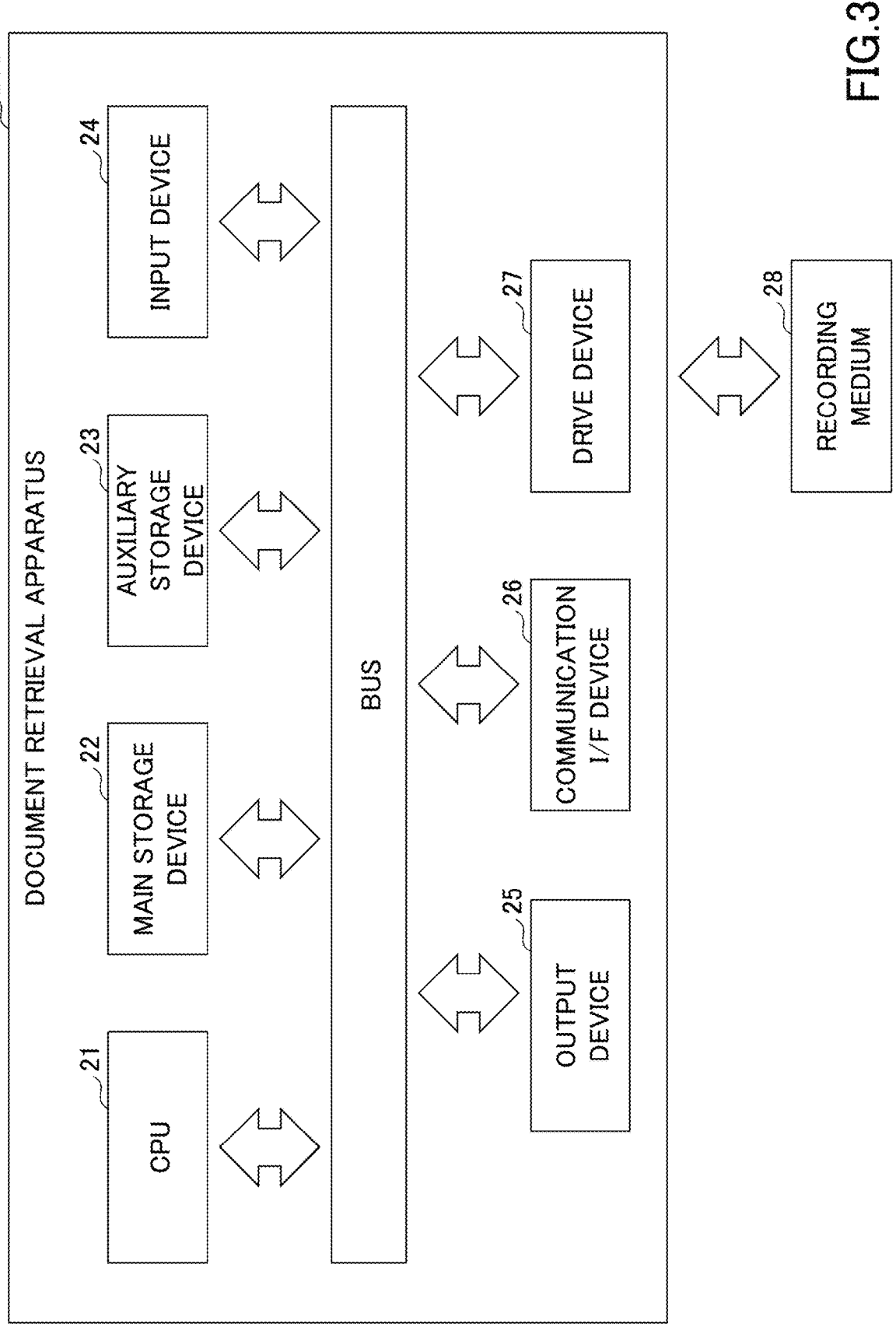
FIG. 3 is a diagram for explaining a hardware configuration of a document retrieval apparatus according to the first embodiment.

Next, a hardware configuration of the document retrieval apparatus 200 according to this embodiment will be described, with reference to FIG. 3. FIG. 3 is a diagram for explaining the hardware configuration of the document retrieval apparatus according to the first embodiment.

The document retrieval apparatus 200 according to this embodiment is an apparatus for processing document information, including an image input device and a computer. In other words, the document retrieval apparatus 200 according to this embodiment is an information processing apparatus including a central processing unit (CPU) 21, a main storage device 22, an auxiliary storage device 23, an input device 24, an output device 25, a communication interface device 26, and a drive device 27 which are connected via a bus, respectively.

The CPU 21 is a main control unit which controls the operation of the document retrieval apparatus 200, and various kinds of functions, which will be described later, can be performed by reading a document retrieval program stored in the main storage device 22, and executing the document retrieval program.

At the start of the document retrieval apparatus 200, the document retrieval program is read from the auxiliary storage device 23 and stored in the main storage device 22. The auxiliary storage device 23 stores the installed document retrieval program, and also stores the necessary files, data, or the like of each of the databases described above.

The input device 24 is a device for inputting various kinds of information, and may be a keyboard, a pointing device, or the like, for example. The output device 25 is a device for outputting various kinds of information, and may be a display or the like, for example. The communication interface device 26 includes a LAN card or the like, and is used to make a connection to the network.

The document retrieval program for realizing the retrieval processing unit 240 according to this embodiment is at least a part of various kinds of programs controlling the document retrieval apparatus 200. The document retrieval program may be provided by distributing a recording medium 28, downloading from the network, or the like, for example. Various types of recording media, including recording media for optically, electrically, or magnetically recording information, such as a CD-ROM, a flexible disk, a magneto-optical disk, or the like, semiconductor memories for electrically recording information, such as a ROM, a flash memory, or the like, may be used for the recording medium 28 recorded with the document retrieval program.

In addition, the document retrieval program is installed in the auxiliary storage device 23 from the recording medium 28 via the drive device 27, when the recording medium 28 recorded with the document retrieval program is set in the drive device 27. The document retrieval program downloaded from the network is installed in the auxiliary storage device 23 via the communication interface device 26.

Next, each of the databases according this embodiment will be described, with reference to FIG. 4 through FIG. 6.

Each of the databases according to this embodiment may be provided in a storage area of the auxiliary storage device 23 or the like, for example.

FIG. 4 is a diagram illustrating an example of the digital document database according to the first embodiment. The digital document database 210 according to this embodiment associates a document ID, a document name, an author's name, and a document file, as items of information. In the digital document database 210, the information including values of each of the items is digital document information.

The value of the item "document ID" is identification information for identifying a paper document stored as image data in the document image database 230. The value of the item "document ID" may be famed by a creation date of the image data of the handwritten document, and a branch number added to the creation date.

The value of the item "document name" is a name of the paper document stored as the image data in the document image database 230.

The value of the "author's name" is the name of the author who wrote the handwritten characters on the paper document identified by the document name. In other words, the value of the item "author's name" is information for identifying the person who wrote the handwritten characters on the paper document.

The value of the item "document file" is the document file itself obtained by performing the OCR process on the image data of the paper document identified by the document name. The document file in this embodiment is text data.

In the example illustrated in FIG. 4, it may be seen that the paper document having the paper document name "Monthly Report_June 1960" was created by a person having the author's name "i", and the text data is "Monthly Report_June 1960 Text".

FIG. 5 is a diagram illustrating an example of the associating keyword database according to the first embodiment. The associating keyword database 220 according to this embodiment includes an author's name, a keyword, and an associating keyword, as items of information. In the associating keyword database 220, information including values of each of the items is the associating information.

The value of the item "keyword" indicates the keyword intended by the author identified by the author's name. In other words, the value of the item "keyword" is the correct character string illustrated in FIG. 2.

The value of the item "associating keyword" corresponds to a character string including characters that are erroneously recognized results of handwritten characters input by the author. In other words, the value of the item "associating keyword" is the digital character string illustrated in FIG. 2.

In the example illustrated in FIG. 5, the author's name "i", a keyword "水酸化", and an associating keyword "カ酸ヒ", for example, are associated with each other. This indicates that the result of the OCR process with respect to the handwritten character string "水酸化" input by the author is erroneously recognized as "カ酸ヒ".

FIG. 6 is a diagram illustrating an example of the document image database according to the first embodiment. The document image database 230 according to this embodiment includes a document ID, a document name, and document image data, as items of information.

The value of the item "document image data" is the image data obtained by reading the paper document by the optical reading device. The document image data according to this embodiment may be stored as a pdf file, or as image data, for example.

In the following description, information in the document image database 230, including the value of the item "document ID" and the values of the other items, will be referred to as the document image information.

The document image database 230 may include items other than the items illustrated in FIG. 6. More particularly, the date on which the document image information is stored in the document image database 230, the name of the person who performed the process of storing the document image information, or the like, for example, may be included as the item of the document image database 230.

Figure 7:
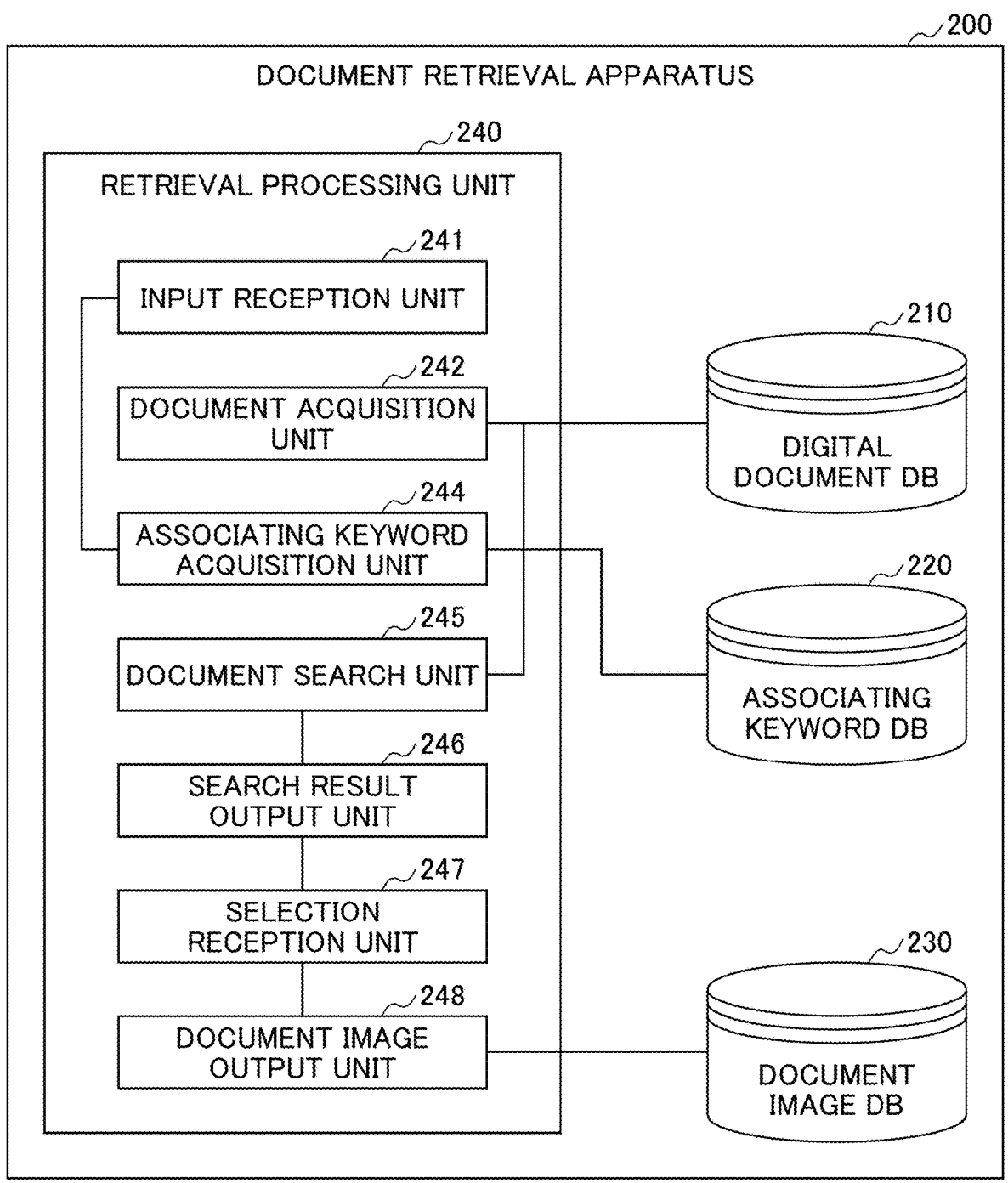
FIG. 7 is a diagram for explaining functions of the document retrieval apparatus according to the first embodiment.

Next, functions of the document retrieval apparatus 200 according to this embodiment will be described, with reference to FIG. 7. FIG. 7 is a diagram for explaining the functions of the document retrieval apparatus according to the first embodiment.

The document retrieval apparatus 200 according to this embodiment includes the digital document database 210, the associating keyword database 220, the document image database 230, and the retrieval processing unit 240.

The retrieval processing unit 240 according to this embodiment includes an input reception unit 241, a document acquisition unit 242, an associating keyword acquisition unit 244, a document search unit 245, a search result output unit 246, a selection reception unit 247, and a document image output unit 248.

The input reception unit 241 receives various kinds of inputs with respect to the document retrieval apparatus 200. More particularly, the input reception unit 241 receives the input of a search request using the input keyword.

The document acquisition unit 242 acquires the document file and the name of the author of the handwritten document, stored in the digital document database 210.

The associating keyword acquisition unit 244 references the associating keyword database 220, and acquires the associating keyword associated with both the author's name acquired by the document acquisition unit 242, and the input keyword.

The document search unit 245 performs a search using the input keyword, and a search using the associating keyword, with respect to the document file acquired by the document acquisition unit 242. In addition, the document search unit 245 may perform a fuzzy search with respect to the document file, using the input keyword and the associating keyword.

More particularly, the document search unit 245 may generate a search keyword by replacing a part of the character strings with arbitrary character strings, for each of the input keyword and the associating keyword, and perform the search with respect to the document file using the generated keyword.

The search result output unit 246 outputs a search result of the document search unit 245. More particularly, the search result output unit 246 displays, on the terminal device 300 or the like, a list of a part of the text data of the document file including the input keyword or the associating keyword used for the search, such as a part of the text data including the keyword, for example, as the search result.

The selection reception unit 247 receives a selection of a particular search result from the list of the output search result. More particularly, the selection reception unit 247 receives the selection with respect to a part of the document file displayed as the search result.

The document image output unit 248 references the document image database 230, and acquires and outputs the document image data corresponding to the search result selected by the selection reception unit 247. More particularly, the document image output unit 248 acquires the document image data corresponding to the search result, and displays on the terminal device 300 a part of the document image including the keyword, for example.

Figure 8:
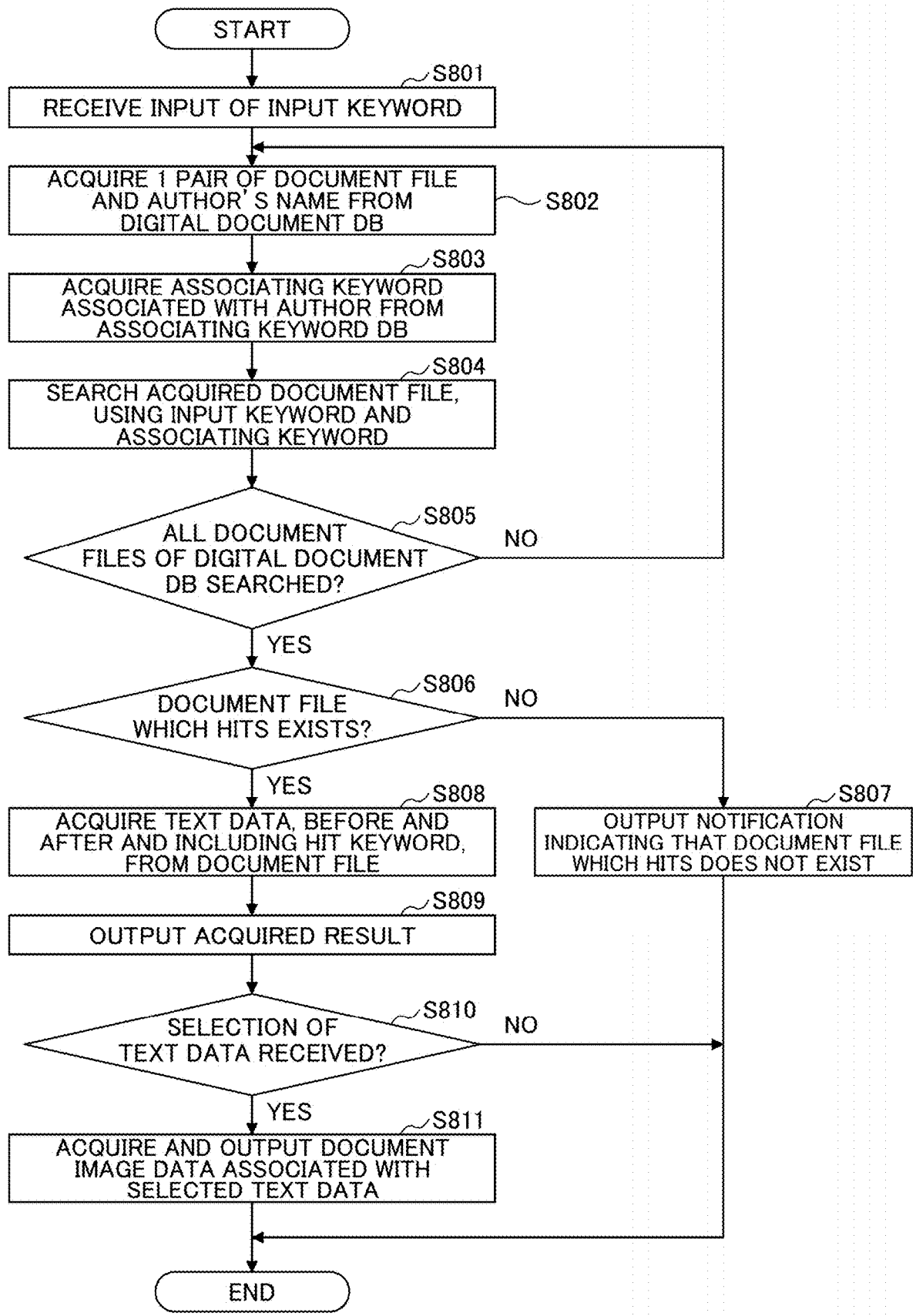
FIG. 8 is a flow chart for explaining an operation of the document retrieval apparatus according to the first embodiment.

Hereinafter, an operation of the document retrieval apparatus 200 according to this embodiment will be described, with reference to FIG. 8. FIG. 8 is a flow chart for explaining the operation of the document retrieval apparatus according to the first embodiment.

The retrieval processing unit 240 of the document retrieval apparatus 200 according to this embodiment receives the input of the input keyword, by the input reception unit 241 (step S801).

Then, the retrieval processing unit 240 acquires one document file, and the author's name associated with this document file, from the document files stored in the digital document database 210, by the document acquisition unit 242 (step S802).

Next, the retrieval processing unit 240 references the associating keyword database 220 and acquires the associating keyword associated with the input keyword and the author's name, by the associating keyword acquisition unit 244 (step S803).

Next, the retrieval processing unit 240 retrieves the document file acquired in step S802, using the input keyword and the associating keyword, by the document search unit 245 (step S804). In this case, the document search unit 245 may hold the document ID or the like of the document file which is acquired as the search result.

In this case, the document search unit 245 according to this embodiment may perform a fuzzy search with respect to both or one of the input keyword and the associating keyword.

The fuzzy search refers to a wildcard search in which a part of the character string is replaced with an arbitrary character, for example. The wildcard search is merely an example, and the fuzzy search may perform a search other than the wildcard search. More particularly, the document search unit 245 may perform a word similarity search using the Word2Vec technology or deep learning, for example.

Next, the document search unit 245 determines whether or not the search is performed with respect to all of the document files stored in the digital document database 210 (step S805). In step S805, if the search is not performed with respect to all of the document files, the retrieval processing unit 240 returns to the process of step S802.

In step S805, if the search is performed with respect to all of the document files, the retrieval processing unit 240 determines whether or not there exists a document file which hit as the search result, by the search result output unit 246 (step S806).

In step S806, if the document file which hits does not exist, the retrieval processing unit 240 outputs a notification indicating that the document file which hits does not exist to the terminal device 300, by the search result output unit 246 (step S807), and ends the process.

In step S806, if the document file which hits exists, the search result output unit 246 acquires the text data, including the hit keyword, from the document file which hit (step S808).

Next, the search result output unit 246 outputs a list of a part of the text data of the acquired text data, before and after and including the hit keyword, for example, to the terminal device 300, as the search result (step S809).

Then, the retrieval processing unit 240 determines whether or not selection with respect to the text data output as the search result is received by the selection reception unit 247 (step S810).

In step S810, if the selection is not received, the retrieval processing unit 240 ends the process.

In step S810, when the selection is received, the document image output unit 248 acquires the document image data associated with the document ID of the document file including the selected text data from the document image database 230, and outputs a part of the document image including the keyword described above, for example, to the terminal device 300 (step S811), and ends the process.

With respect to the text data output as the search result, the user who performs the search can select at least a part of the text data including the keyword hit by the search, and cause the display of the document ID of the document file including the part of the selected text data, and the associated document image data, so that the user can verify that the hit document file is the desired document file. That is, when the user who performs the search acquires the search result, the user can perform a selection process with respect to the selection reception unit 247 to select a part of the output text data, and cause the display of the document image data associated with the hit document file, so that the user can verify that the acquired search result is appropriate.

Hereinafter, a display example of a list of search result output to the terminal device 300 in step S809 illustrated in FIG. 8 will be described, with reference to FIG. 9.

Figure 9:
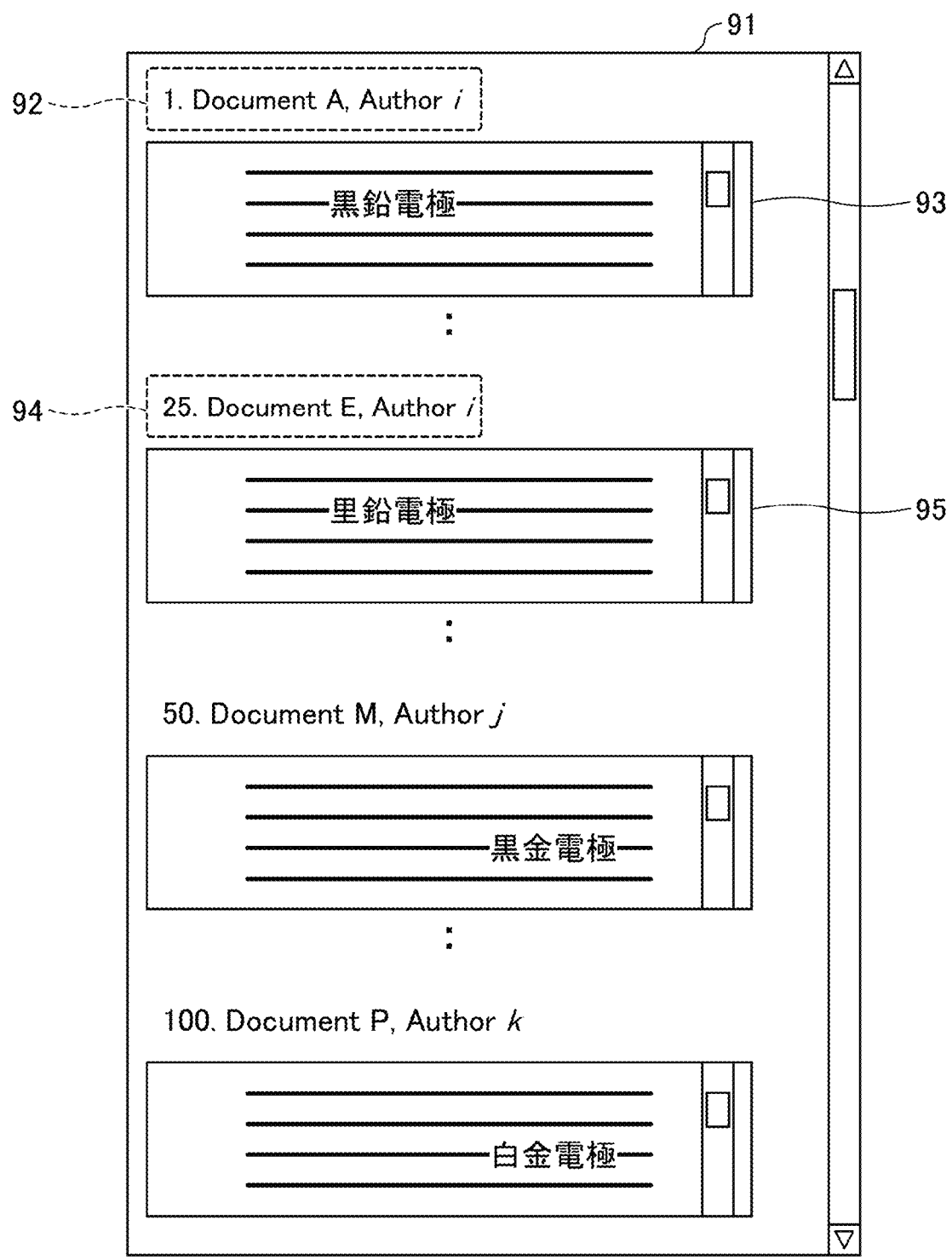
FIG. 9 is a first diagram for explaining a display example of a list of search result according to the first embodiment.

FIG. 9 is a first diagram for explaining the display example of the list of search result according to the first embodiment. A screen 91 illustrated in FIG. 9 illustrates an example of the list of search result for a case where "黒鉛電極", including "黒鉛" as the input keyword, is input when searching for "黒鉛電極". In this case, "電極" of "黒鉛電極" is used for the search as a fixed keyword, and the fixed keyword is used for the search in combination with the input keyword and the associating keyword, or the like.

In this case, the retrieval processing unit 240 first references the digital document database 210, and acquires the document file of the document ID "1", and the author's name "i" associated with the document ID "1" (refer to FIG. 4).

Next, the retrieval processing unit 240 references the associating keyword database 220, and acquires the associating keyword associated with the input keyword "黒鉛" and the author's name "i". In this case, "里鉛" is acquired from the associating keyword database 220, as the associating keyword associated with the character string "黒鉛" and the author's name "i" (refer to FIG. 5).

When the associating keyword is acquired, the retrieval processing unit 240 searches the document file having the document ID "1", using each of "黒鉛電極" including the input keyword, and "里鉛電極" including the associating keyword. The retrieval processing unit 240 performs this process with respect to all of the document files in the digital document database 210.

As a result, "黒鉛電極" including the input keyword hits the document file having a document name "A", and "里鉛電極" including associating keyword hits the document file having a document name "E".

Accordingly, the retrieval processing unit 240 displays, as the list of search result, information 92 indicating the document name "A" and the author's name "i", and text data 93 of the document file having the document name "A", before and after and including "黒鉛電極" which includes the input keyword. The information 92 is additional information, including the document name and the author's name, for identifying the document file which is the source of the text data 93.

In addition, the retrieval processing unit 240 similarly displays information 94 indicating a document name "E" and the author's name "i", and text data 95 of the document file having the document name "E", before and after and including "里鉛電極" which includes the associating keyword.

In this embodiment, the list of the document name, the author's name, and the text data before and after and including the hit keyword, is displayed for all of the search result.

In this case, the character string, including the input keyword and the associating keyword, may be displayed with emphasis in the text data, such as highlighted display, underlined display, or the like. According to this embodiment, the methods of emphasizing the display in the text data may be different between the character string which includes the input keyword, and the character string which includes the associating keyword.

Further, when the text data 93 is selected on the screen 91, for example, the retrieval processing unit 240 according to this embodiment acquires the document image data having the document ID "1" associated with the text data 93, from the document image database 230, and displays the document image data.

In this embodiment, the search is performed with respect to the document file stored in the digital document database 210, to display the search result, and the document image data associated with the text data selected from the search result is displayed on the terminal device 300.

In this embodiment, even if the correct character string, which is to be referenced as the input keyword, is erroneously recognized in the document file associated with the document image data, for example, the document file desired by the user who input the input keyword can be acquired as the search result.

Figure 10:
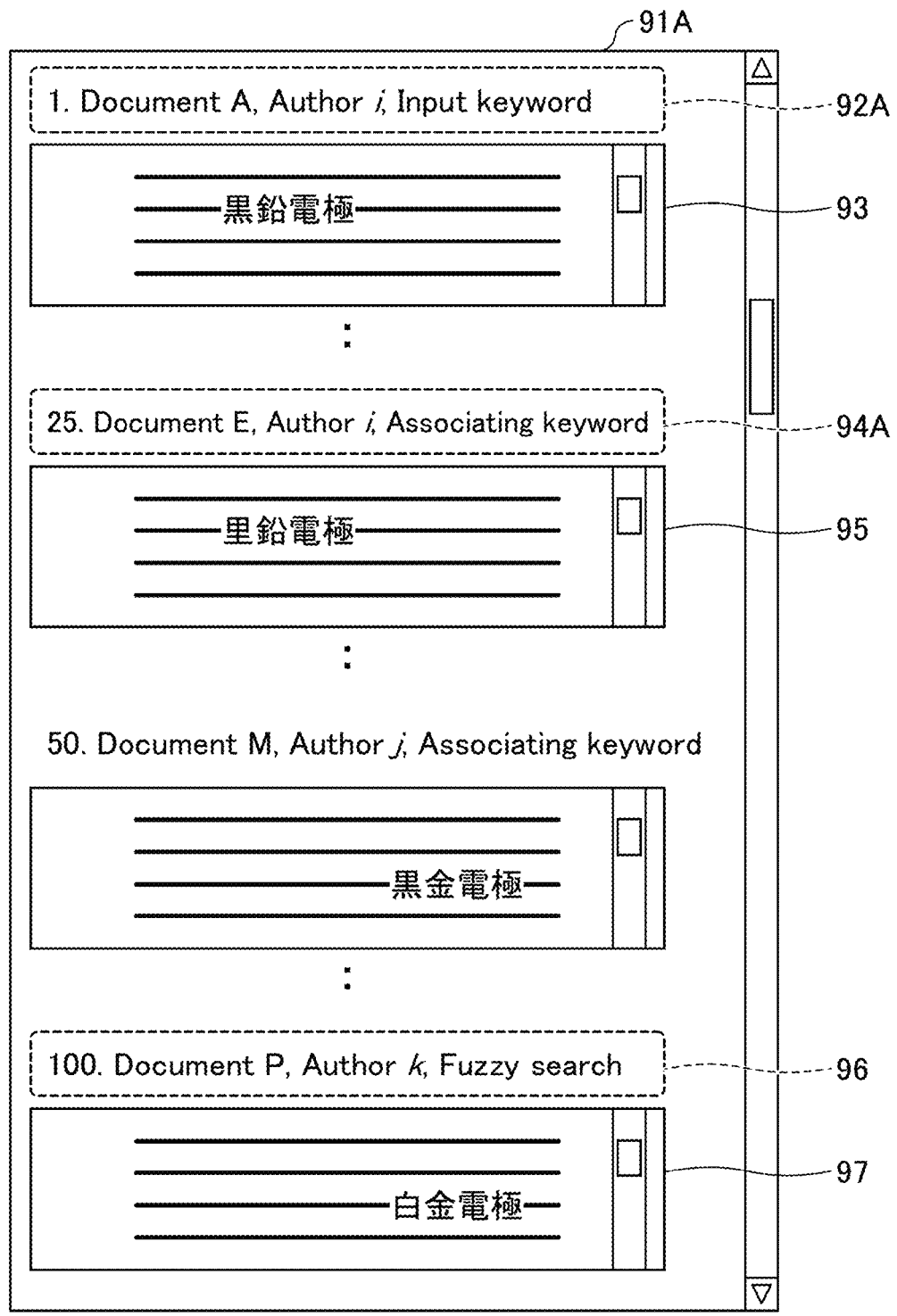
FIG. 10 is a second diagram for explaining the display example of the list of search result according to the first embodiment.

FIG. 10 is a second diagram for explaining the display example of the list of search result according the first embodiment. A screen 91A illustrated in FIG. 9 illustrates an example of the list of search result for a case where "黒鉛電極", including "黒鉛" as the input keyword, is input.

In the screen 91A illustrated in FIG. 10, the information added to the text data is different from that of the example illustrated in FIG. 9. In the screen 91A, information 92A added to the text data 93 includes the document name "A" of the document file, and the author's name "i", and indicates that the keyword hit by the search is the input keyword.

Moreover, information 94A added to the text data 95 includes the document name "E" of the document file, and the author's name "i", and indicates that the keyword hit by the search is the associating keyword.

Furthermore, information 96 added to the text data 97 includes a document name "P" of the document file, and the author's name "k", and indicates that the keyword hit by the search is the keyword used for the fuzzy search.

Hence, in this embodiment, the type of keyword included in the text data acquired as the search result can be included in the list of search result.

By taking the measures described above, this embodiment enables the user who performs the search to easily find the desired document image data, for example, and enables verification of whether or not the search result acquired using the associating keyword was appropriate.

More particularly, suppose, for example, that the user who performs the search desires to browse the document image data of the paper document including the characters written by the author "i" without knowing that the person who wrote the characters is the author "i". In this case, the document file including the associating keyword of the author "i" may more closely correspond to the document image data desired by the user than the document file including the input keyword. In this case, the user can browse the desired document image data by selecting the text data 95, for example.

Moreover, in this embodiment, the search result may be assigned a priority according to the type of keyword used for the search, and the search result may be displayed based on the priority in the list of search result illustrated in FIG. 9 and FIG. 10. The search result includes the text data, and the additional information added to the text data.

More particularly, in this embodiment, the input keyword may be set to have the highest priority, the associating keyword may be set to have the next highest priority, and the keyword used for the fuzzy search may be set to have the lowest priority.

In this case, as illustrated in FIG. 10, the search result including the input keyword is displayed at the top of the list, and the search result including the keyword used for the fuzzy search is displayed at the bottom of the list.

Accordingly, this embodiment can display the search result to the user in an order from the document file having a highest accuracy of the character recognition, by assigning the priority in the display order of the search result.

Second Embodiment

A second embodiment will now be described with reference to the drawings. The second embodiment differs from the first embodiment in that the associating keyword database is updated according to the selection of the text data in the list of search result. Accordingly, in the following description of the second embodiment, the differences between the first embodiment and the second embodiment will be described, and those elements having functional configurations similar to those of the first embodiment are designated by the same reference numerals, and a description thereof will be omitted.

Figure 11:
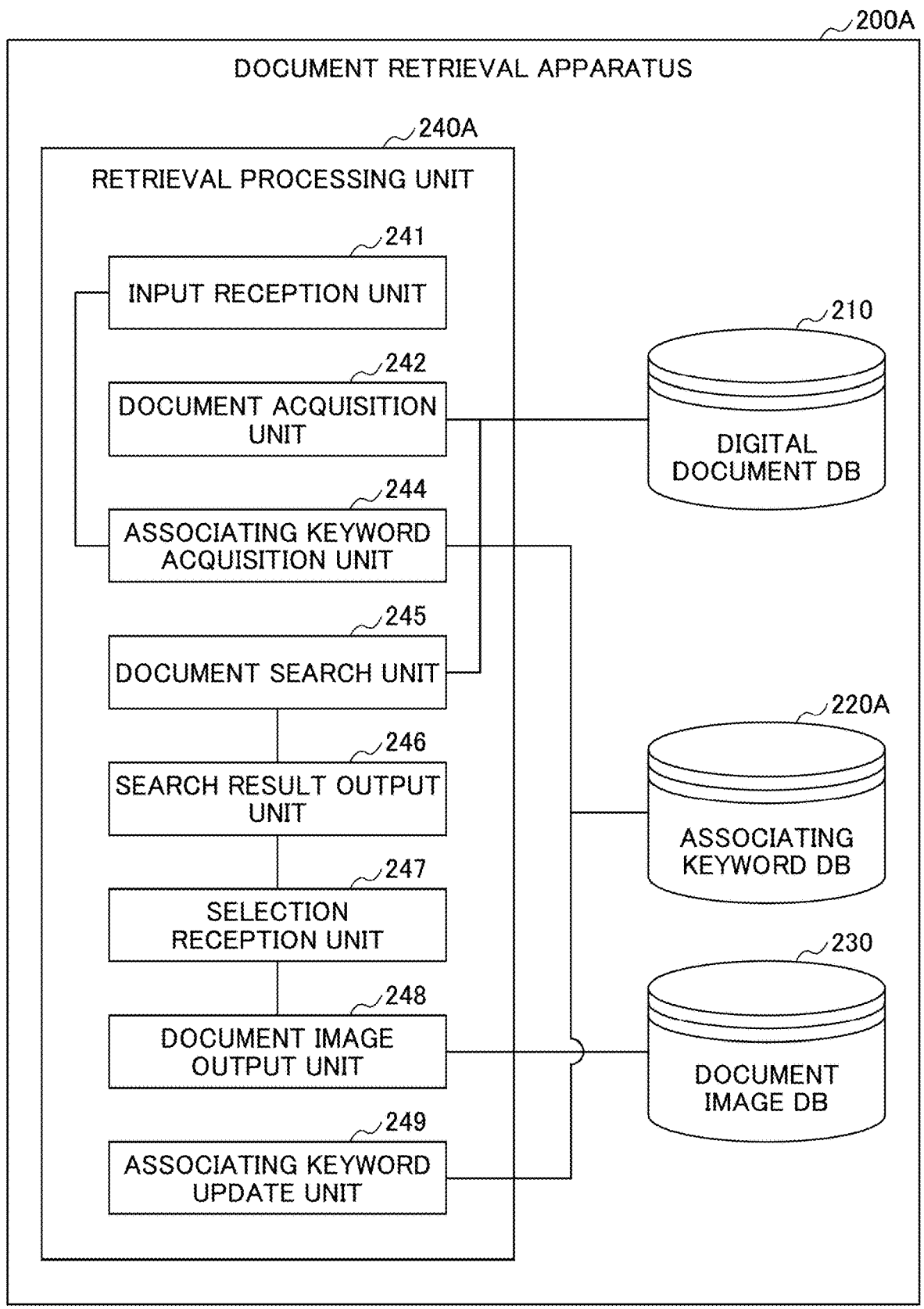
FIG. 11 is a diagram for explaining the functions of the document retrieval apparatus according to a second embodiment.

FIG. 11 is a diagram for explaining the functions of the document retrieval apparatus according to the second embodiment.

A document retrieval apparatus 200A according to this embodiment includes the digital document database 210, an associating keyword database 220A, the document image database 230, and a retrieval processing unit 240A.

The associating keyword database 220A according to this embodiment is updated each time the text data is selected from the list of search result. Details of the associating keyword database 220A will be described later.

The retrieval processing unit 240A according to this embodiment includes an associating keyword update unit 249, in addition to each of the units of the retrieval processing unit 240 according to the first embodiment.

The associating keyword update unit 249 updates the associating keyword database 220A each time the selection reception unit 247 receives the selection of the text data, that is, each time the document image data is output. Details of processes performed by the associating keyword update unit 249 will be described later.

FIG. 12 is a diagram illustrating an example of the associating keyword database according to the second embodiment. The associating keyword database 220A according to this embodiment includes a selection number, in addition to the author's name, the keyword, and the associating keyword, as items of information.

The value of the item "selection number" indicates the number of times the text data, including a combination of the author's name and the input keyword or the associating keyword, is selected from the list of search result. A reference may be made to the value of the item "selection number" when displaying the list of search result.

Figure 13:
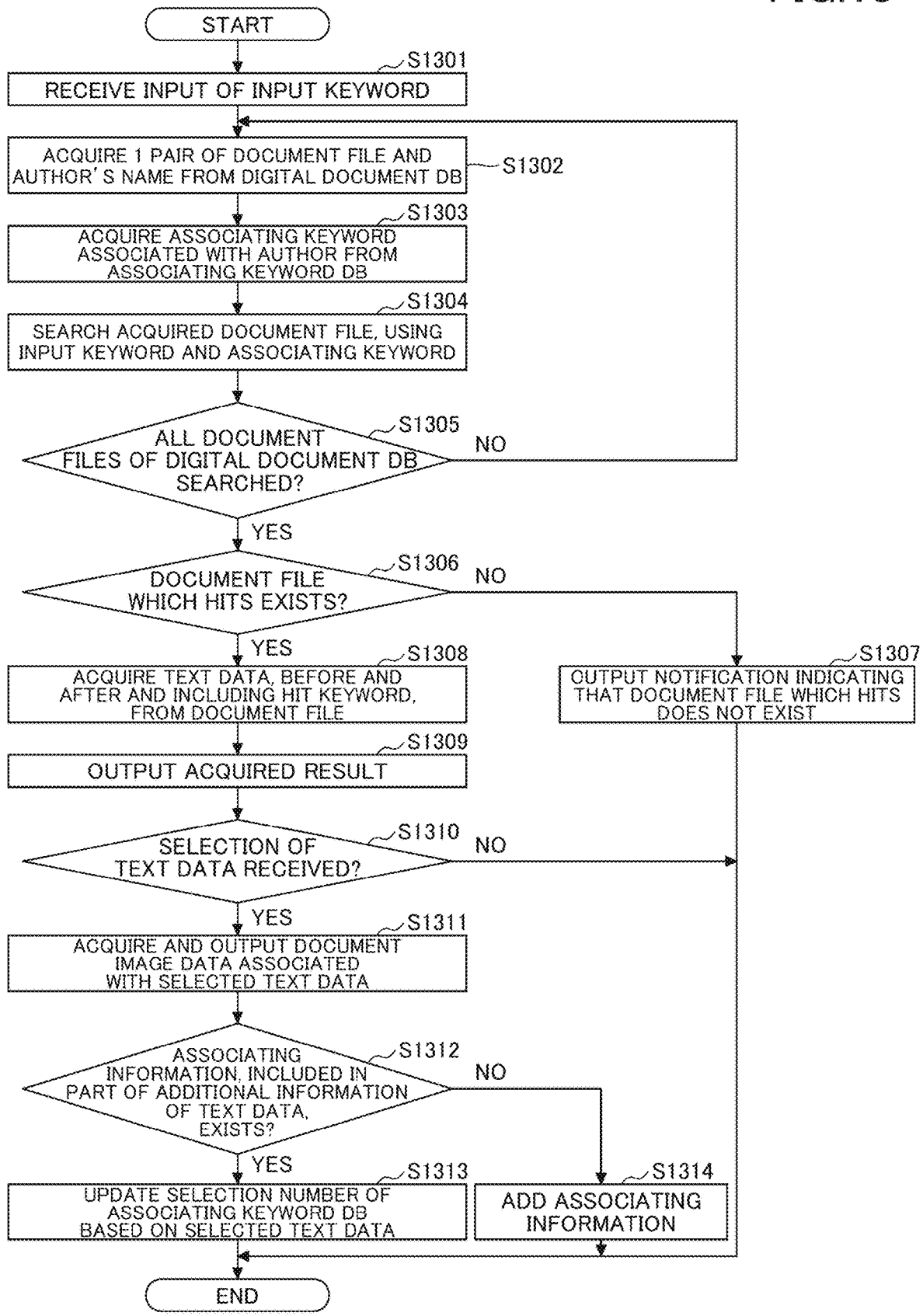
FIG. 13 is a flow chart for explaining the operation of the document retrieval apparatus according to the second embodiment.

Next, the operation of the document retrieval apparatus 200A according to this embodiment will be described, with reference to FIG. 13. FIG. 13 is a flow chart for explaining the operation of the document retrieval apparatus according to the second embodiment.

Because the processes from step S1301 through step S1311 in FIG. 13 are the same as the processes from step S801 through step S811 in FIG. 8, a description thereof will be omitted.

When the retrieval processing unit 240A acquires and outputs the document image data to the terminal device 300 in step S1311, the retrieval processing unit 240A determines whether or not the associating information, associated with the additional information added to the selected text data, exists in the associating keyword database 220A (step S1312).

In step S1312, if the associating information associated with the additional information exists in the associating keyword database 220A, the associating keyword update unit 249 updates and stores the selection number of the associating information associated with the additional information in the associating keyword database 220A (step S1313), and ends the process. More particularly, the associating keyword update unit 249 increments the selection number of the associating information associated with the additional information by one, and ends the process.

In step S1312, if the associating information associated with the additional information does not exist, the retrieval processing unit 240 generates and adds new associating information based on the additional information, stores the new associating information in the associating keyword database 220A (step S1314), and ends the process.

Hereinafter, the processes of the associating keyword update unit 249 will be specifically described, with reference to FIG. 9, FIG. 10, and FIG. 12.

For example, suppose that text data 95 is selected on the screen 91. In this case, the text data 95 is added with the additional information 94.

The text data 95 is hit by the keyword " 里鉛", and the additional information 92 includes information indicating the author's name "i". Thus, the selection of the text data 95 means that a combination of the keyword " 里鉛" and the author's name "i" is selected.

Accordingly, the associating keyword update unit 249 increments the value of the selection number by one, in associating information 121 of the associating keyword database 220A.

For example, suppose that the text data 97 is selected on the screen 91A illustrated in FIG. 10. In this case, the text data 97 is added with the additional information 96.

The text data 97 is hit by a keyword " 白金" generated by the fuzzy search, and the additional information 96 includes information indicating an author's name "k". Thus, the selection of the text data 97 means that a combination of the keyword " 白金" and the author's name "k" is selected.

Because the associating keyword database 220A does not store the associating information associating the keyword "白金" and the author's name "k", the associating keyword update unit 249 regards the keyword "白金" as a new associating keyword, generates associating information associating the author's name "k", the keyword "黒鉛" which is the input keyword, and the associating keyword "白金", and stores the generated associating information in the associating keyword database 220A by setting the selection number to one.

Thus, in this embodiment, the associating keyword database 220A is updated each time the text data is selected from the search result. In other words, in this embodiment, the associating keyword database 220A is updated each time the document image data to be browsed is selected.

In a case where the retrieval process is repeated, the search result may be displayed in an order starting from the search result hit by the keyword having a large selection number in the associating keyword database 220A, when displaying the search result.

For this reason, according to this embodiment, the more the retrieval process is repeated, the more a hit rate of the keyword search can be increased.

For example, a case where the retrieval process is performed using the input keyword "水酸化" will be considered. In this case, suppose that a document file having the author's name "i" is hit with the input keyword "水酸化", and a document file having the author's name "k" is hit with the associating keyword "水酸ヒ", for example.

In this case, the document search unit 245 references the associating keyword database 220A, and preferentially displays the search result using the associating keyword with a large selection number included in the associating information.

In the example illustrated in FIG. 12, the selection number of associating information 122 including a combination of the associating keyword "カ酸ヒ" and the author's name "i" is 10, and the selection number of associating information 123 including a combination of the associating keyword "水酸ヒ" and the author's name "k" is 12.

Accordingly, the associating keyword update unit 249 displays the text data of the document file hit by the author's name "k" and including the associating keyword "水酸ヒ", at a higher level than the text data of the document file of the author's name "i" and including the associating keyword "カ酸ヒ".

By determining the display order as described above, this embodiment can display the text data in an order starting from the combination with the large selection number selected by the user who performed the search.

Third Embodiment

A third embodiment differs from the first embodiment in that a prediction model for predicting the associating keyword is caused to learn, using the associating information stored in the associating keyword database 220 as learning data, to acquire the predicted associating keyword that is predicted and output using the prediction model. Accordingly, in the following description of the third embodiment, the differences between the first embodiment and the third embodiment will be described, and those elements having functional configurations similar to those of the first embodiment are designated by the same reference numerals, and a description thereof will be omitted.

Figure 14:
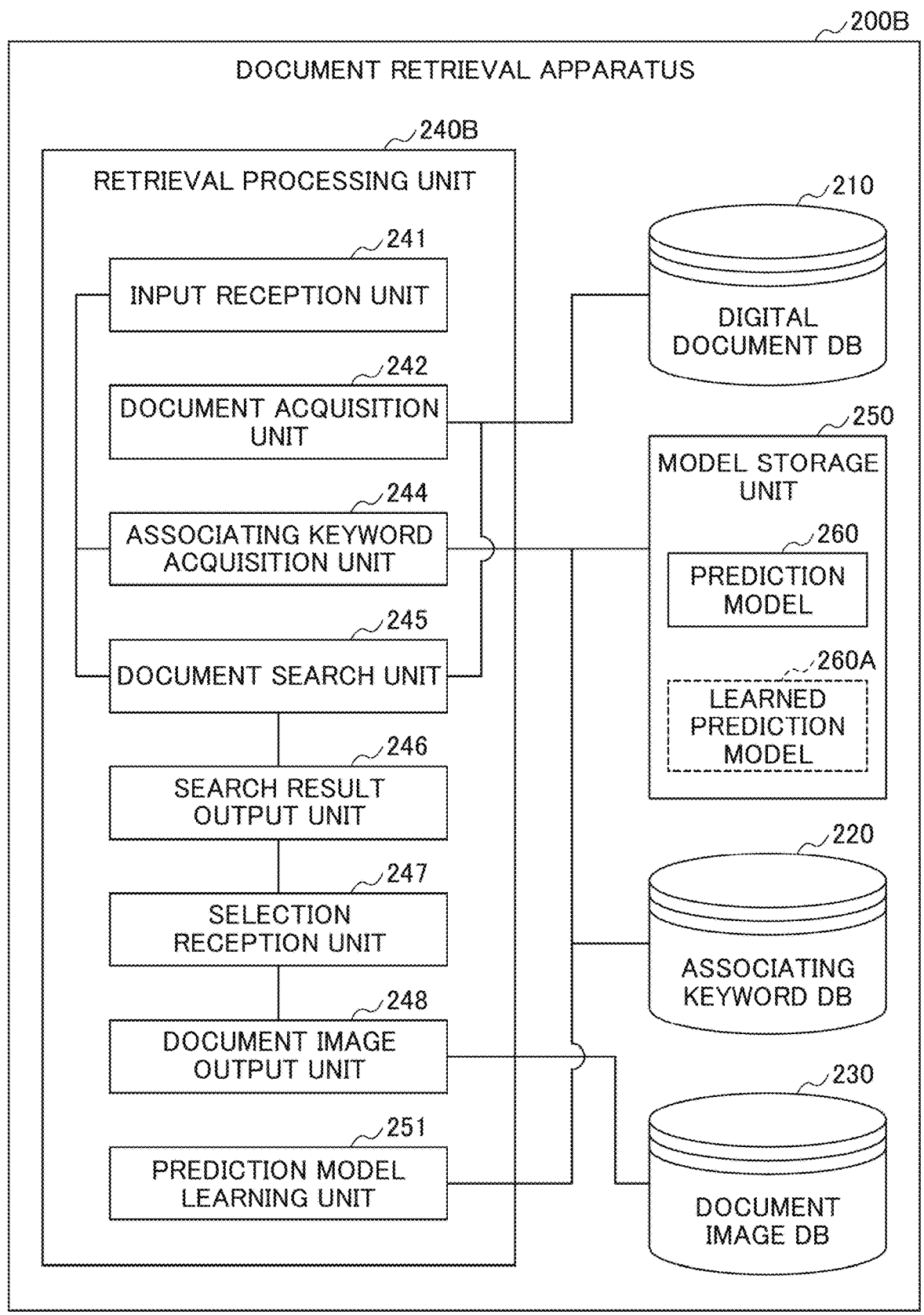
FIG. 14 is a diagram for explaining the functions of the document retrieval apparatus according to a third embodiment.

FIG. 14 is a diagram for explaining the functions of the document retrieval apparatus according to the third embodiment.

A document retrieval apparatus 200B according to this embodiment includes the digital document database 210, the associating keyword database 220, the document image database 230, a retrieval processing unit 240B, and a model storage unit 250.

The retrieval processing unit 240B includes the input reception unit 241, the document acquisition unit 242, the associating keyword acquisition unit 244, the document search unit 245, the search result output unit 246, the selection reception unit 247, the document image output unit 248, and a prediction model learning unit 251.

The prediction model learning unit 251 inputs the associating information stored in the associating keyword database 220 to the prediction model 260, as the learning data, to cause the prediction model 260 to learn by machine learning or the like, and stores a learned prediction model 260A in the model storage unit 250. The model storage unit 250 may store the prediction model 260.

The learned prediction model 260A predicts the associating keyword when the input keyword and the author's name are input, and outputs the predicted associating keyword. A plurality of associating keywords may be predicted.

The associating keyword acquisition unit 244 inputs the author's name and the input keyword, acquired by the document acquisition unit 242, to the learned prediction model 260A stored in the model storage unit 250, and acquires the predicted associating keyword, which is the prediction result, from the learned prediction model 260A.

Figure 15:
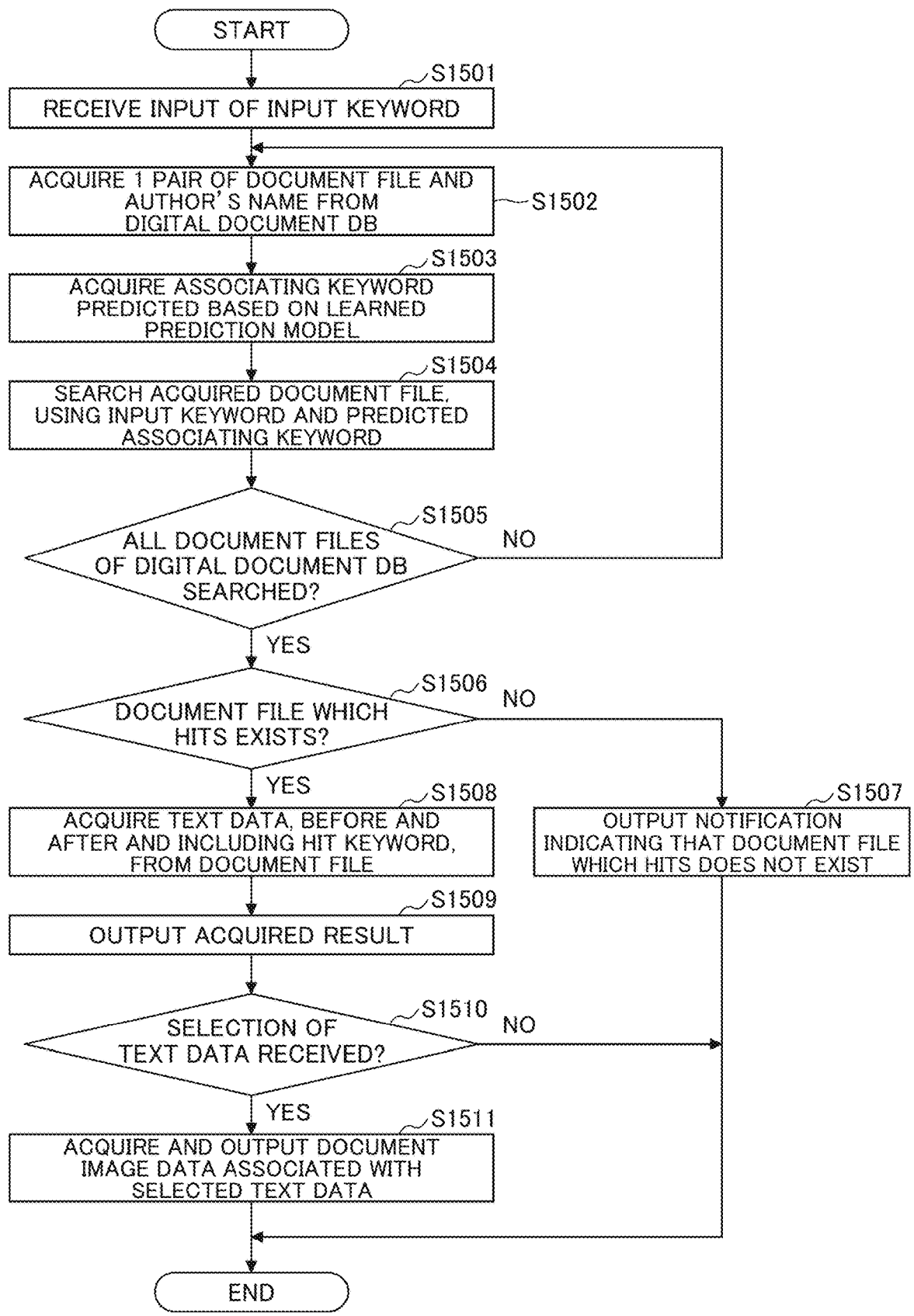
FIG. 15 is a flow chart for explaining the operation of the document retrieval apparatus according to the third embodiment.

FIG. 15 is a flow chart for explaining the operation of the document retrieval apparatus according to the third embodiment. Because the processes of step S1501 and step S1502 in FIG. 15 are the same as the processes of step S801 and step S802 in FIG. 8, a description thereof will be omitted.

When the author's name is acquired in step S1502, the retrieval processing unit 240B inputs the author's name and the input keyword to the learned prediction model 260A, and acquires the predicted associating keyword, which is the prediction result, from the learned prediction model 260A by the associating keyword acquisition unit 244 (step S1503).

Next, the retrieval processing unit 240B searches the document file acquired by the document acquisition unit 242, using the input keyword and the predicted associating keyword, by the document search unit 245 (step S1504).

Because the processes from step S1504 through step S1511 are the same as the processes from step S804 through step S811 in FIG. 8, a description thereof will be omitted.

As described above, in this embodiment, the learned prediction model 260A is built using the associating information stored in the associating keyword database 220 as the learning data. For example, the learned prediction model 260A may predict and output a character string having a shape similar to that of the input keyword, as the associating keyword, based on the input keyword and the author's handwriting.

Fourth Embodiment

A fourth embodiment is a combination of the second embodiment and the third embodiment. In the following description of the fourth embodiment, those elements having functional configurations similar to those of the second embodiment and the third embodiment are designated by the same reference numerals, and a description thereof will be omitted.

Figure 16:
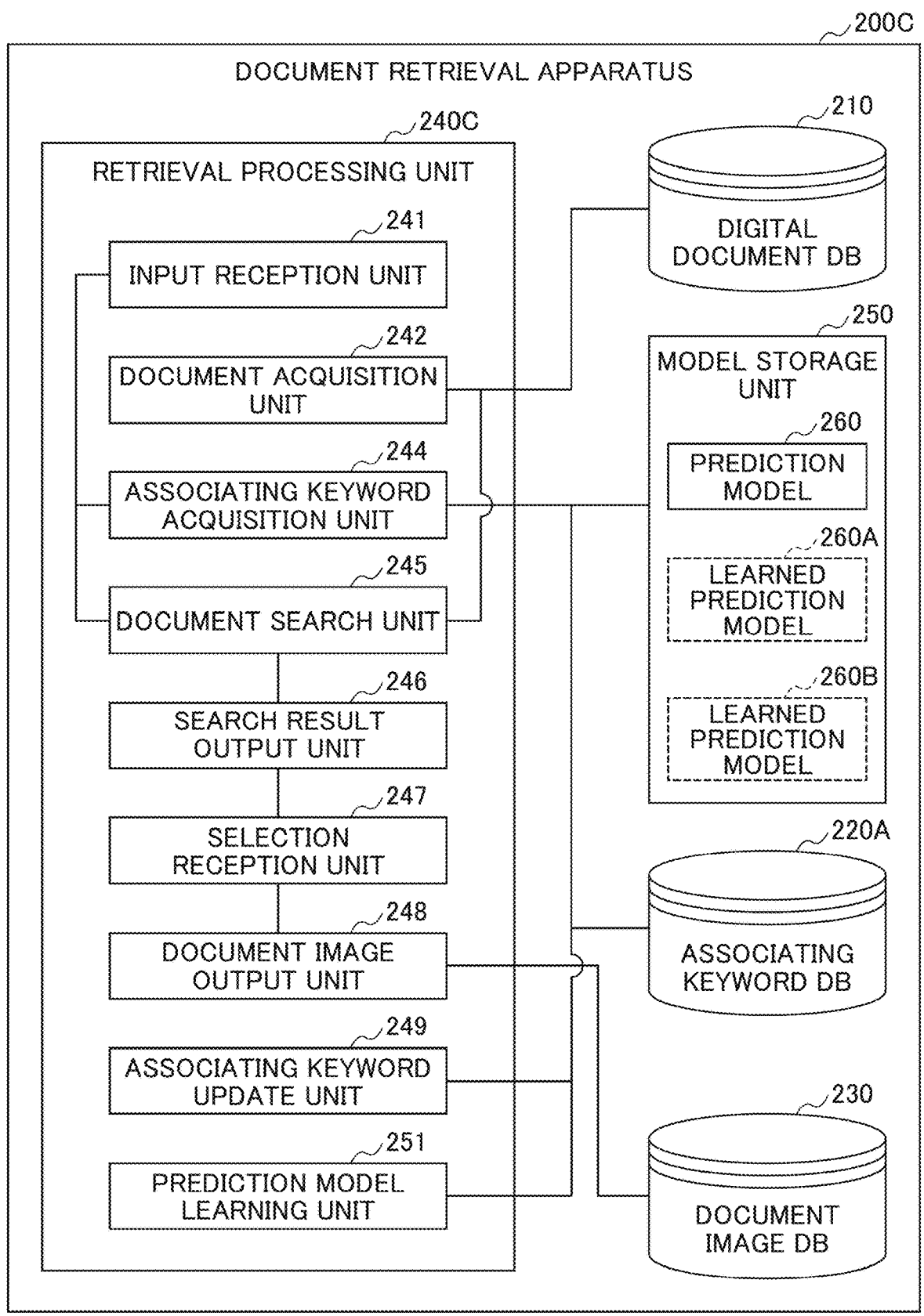
FIG. 16 is a diagram for explaining the functions of the document retrieval apparatus according to a fourth embodiment.

FIG. 16 is a diagram for explaining the functions of the document retrieval apparatus according to the fourth embodiment.

A document retrieval apparatus 200C according to this embodiment includes the digital document database 210, an associating keyword database 220A, the document image database 230, a retrieval processing unit 240C, and the model storage unit 250.

The retrieval processing unit 240C includes each unit of the retrieval processing unit 240B according to the third embodiment, and the associating keyword update unit 249.

Figure 17:
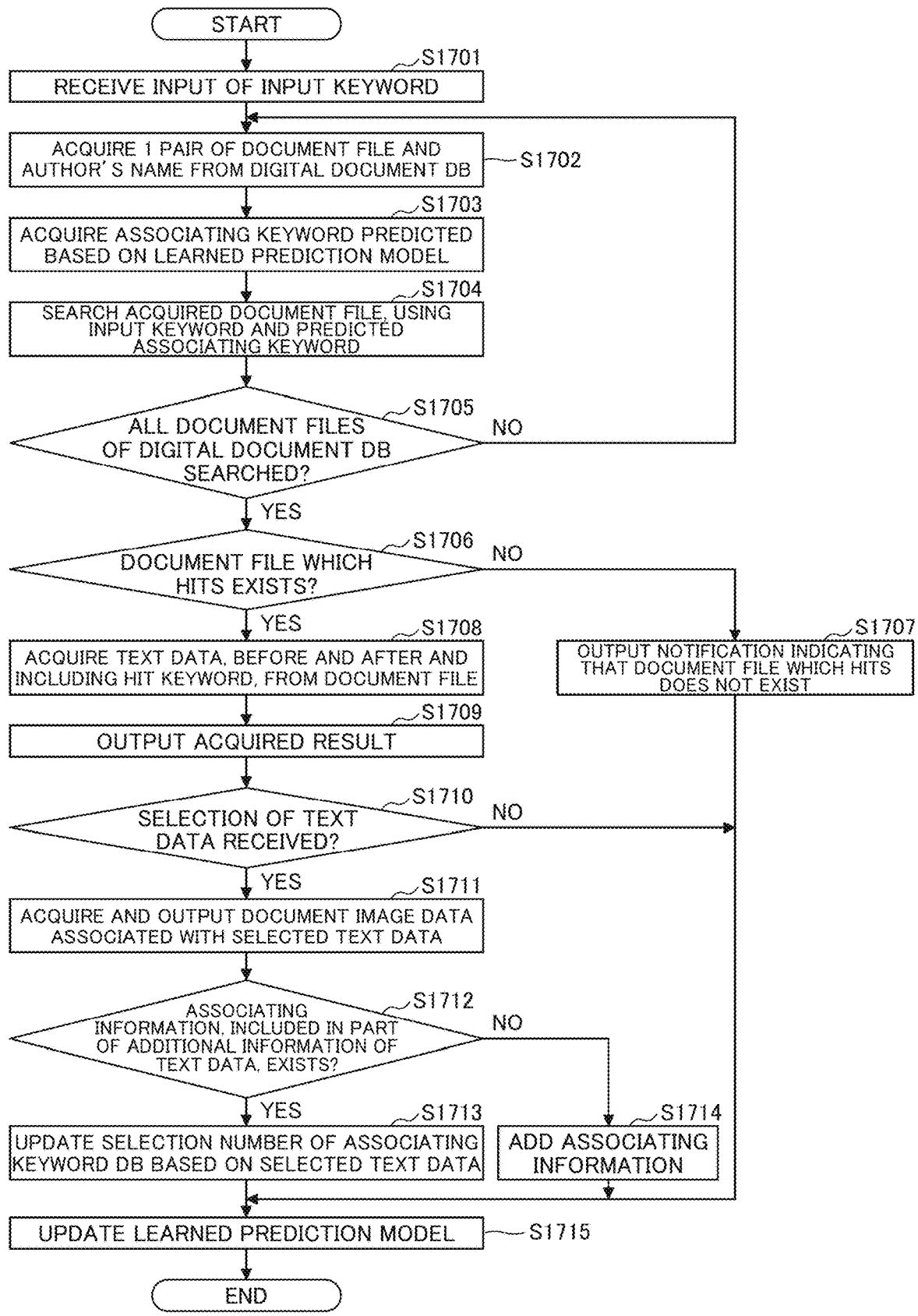
FIG. 17 is a flow chart for explaining the operation of the document retrieval apparatus according to the fourth embodiment.

Hereinafter, the operation of the document retrieval apparatus 200C according to the fourth embodiment will be described, with reference to FIG. 17. FIG. 17 is a flow chart for explaining the operation of the document retrieval apparatus according to the fourth embodiment.

Because the processes from step S1701 through step S1711 in FIG. 17 are the same as the processes from step S1501 through step S1511 in FIG. 15, a description thereof will be omitted.

Because the processes from step S1712 through step S1714, subsequent to step S1711, are the same as the processes from step S1312 through step S1314 in FIG. 13, a description thereof will be omitted.

Subsequent to steps S1713 and S1714, the retrieval processing unit 240C causes the learned prediction model 260A to further learn using the updated associating keyword database 220A, as learning data, by the prediction model learning unit 251, and update the learned prediction model as a learned prediction model 260B which is stored in the prediction model learning unit 251 (step S1715), and ends the process. The update of the learned prediction model in step S1715 does not necessarily need to be performed every time the document retrieval apparatus operates, and may be performed for every plural number of operations according to the operation specified by the user.

In this embodiment, the learned prediction model 260A is updated using the associating keyword database 220A which is updated according to the search result selected by the user who performed the search. In other words, the learned prediction model is updated based on the associating information of the input keyword and the text data selected by the user.

Accordingly, in this embodiment, the more the retrieval process is performed, the more the hit rate using the associating keyword improves.

Fifth Embodiment

A fifth embodiment will be described, with reference to the drawings. The fifth embodiment differs from the third embodiment, in that the fifth embodiment does not include an associating keyword database, and the prediction model is built according to the search result selected by the user who performed the search. Accordingly, in the following description of the fifth embodiment, those elements having functional configurations similar to those of the third embodiment are designated by the same reference numerals, and a description thereof will be omitted.

Figure 18:
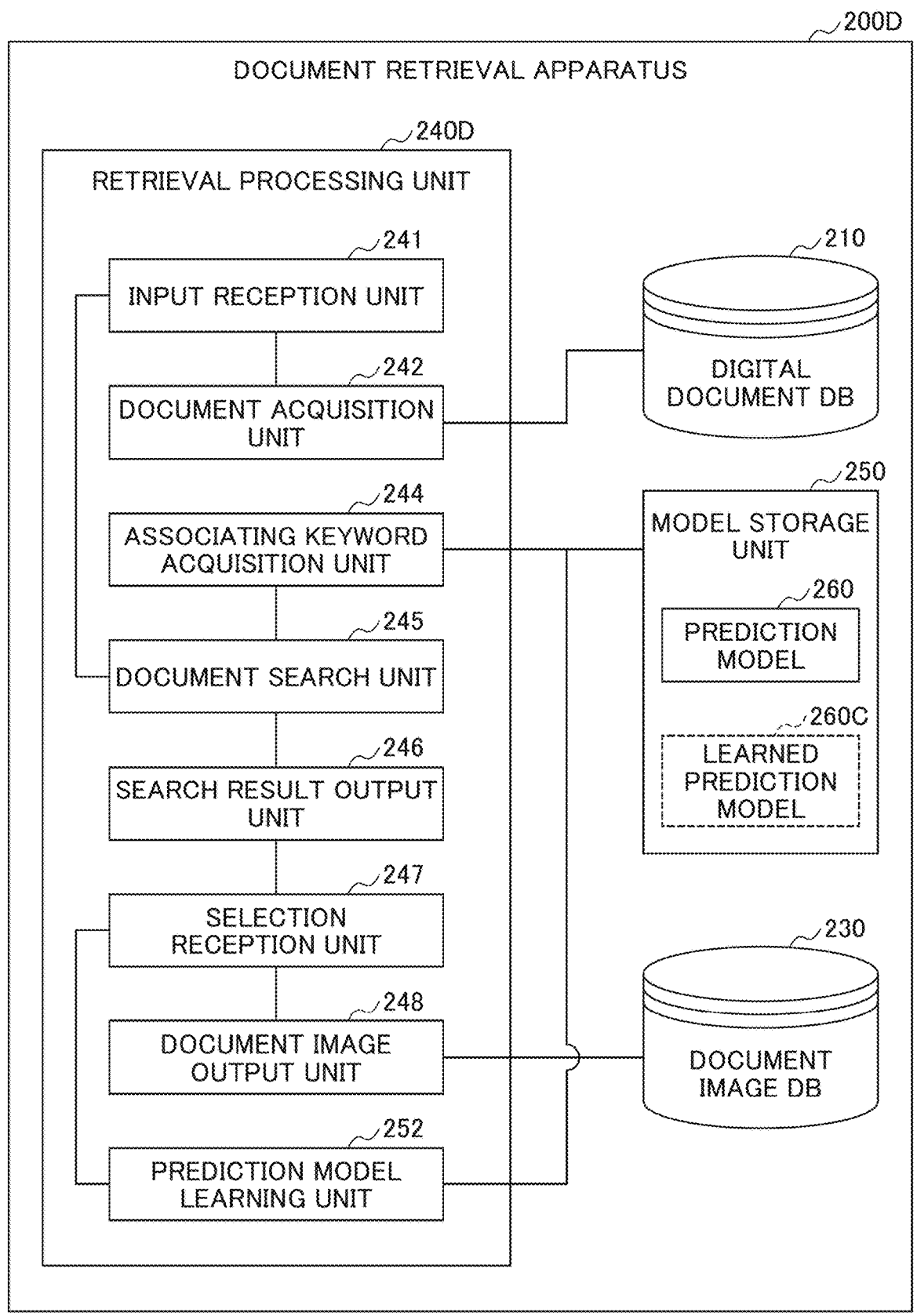
FIG. 18 is a diagram for explaining the functions of the document retrieval apparatus according to a fifth embodiment.

FIG. 18 is a diagram for explaining the functions of the document retrieval apparatus according to the fifth embodiment. A document retrieval apparatus 200D according to this embodiment includes the digital document database 210, the document image database 230, a retrieval processing unit 240D, and the model storage unit 250.

The retrieval processing unit 240D includes the input reception unit 241, the document acquisition unit 242, the associating keyword acquisition unit 244, the document search unit 245, the search result output unit 246, the selection reception unit 247, the document image output unit 248, and a prediction model learning unit 252.

When the text data is selected from the search result output by the search result output unit 246, the prediction model learning unit 252 according to this embodiment holds associating information associating the keyword hit by the search, included in the selected text data, the author's name, and the input keyword.

The keywords hit during the retrieval process before the learned prediction model 260A is built, are the input keyword, and the keyword for the fuzzy search generated from the input keyword.

When an associating information group formed by a predetermined number of associating information is accumulated, the prediction model learning unit 252 causes the prediction model 260 to learn using the associating information group as the learning data, and stores a learned prediction model 260C in the model storage unit 250. The prediction model learning unit 252 according to this embodiment may provide the associating information group to an artificial intelligence or the like, for example, in order to acquire the learned prediction model 260C.

After the learned prediction model 260C is constructed, the retrieval processing unit 240D acquires an associating keyword that is predicted and output using the learned prediction model 260C.

Figure 19:
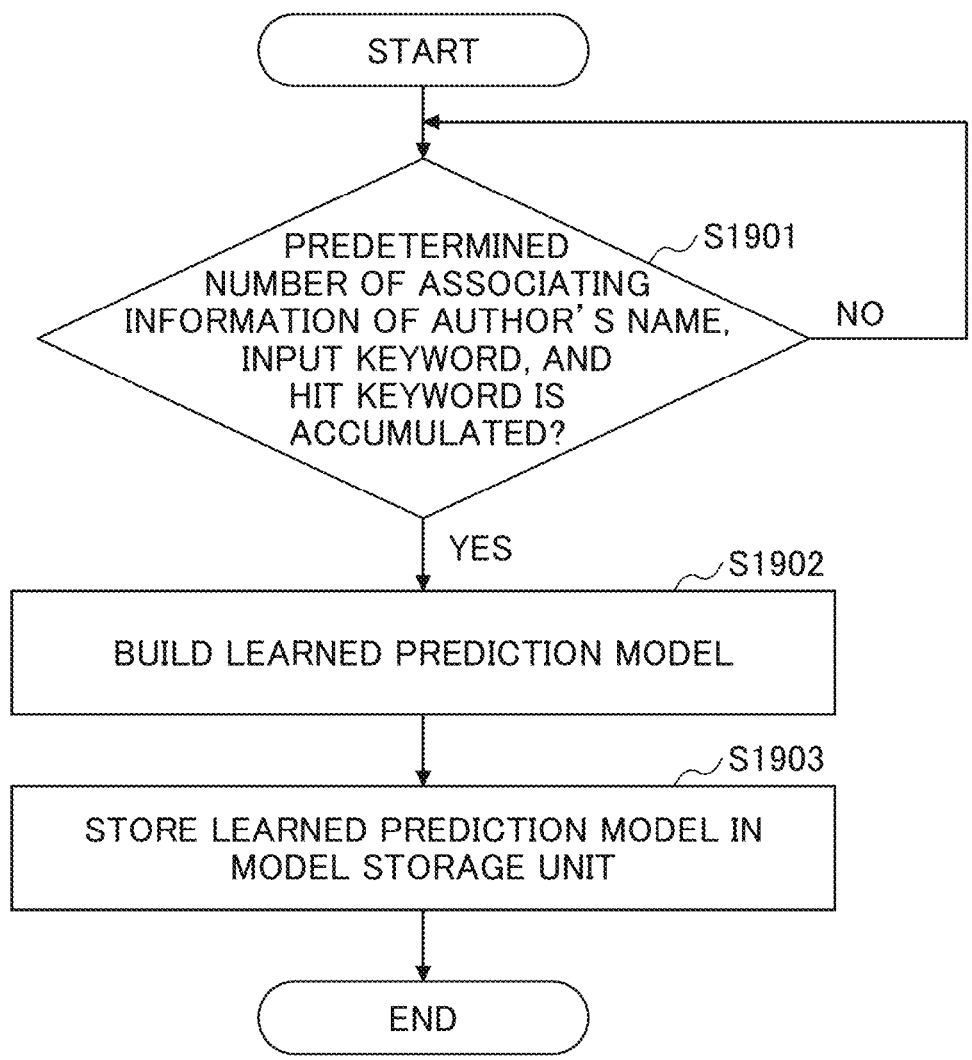
FIG. 19 is a flow chart for explaining processes of a prediction model learning unit according to the fifth embodiment.

Hereinafter, the processes of the prediction model learning unit 252 according to this embodiment will be described, with reference to FIG. 19. FIG. 19 is a flow chart for explaining the processes of the prediction model learning unit according to the fifth embodiment.

The prediction model learning unit 252 according to this embodiment determines whether or not the predetermined number of associating information of the author's name, the input keyword, and the hit keyword is accumulated (step S1901). The predetermined number may be a minimum number required to build the prediction model 260, or may be a number determined in advance. The predetermined number of associating information accumulated, and forming the associating information group, may be 2 or greater, preferably 5 or greater, and more preferably 10 or greater.

In step S1901, if the predetermined number of associating information is not accumulated, the prediction model learning unit 252 waits until the predetermined number of associating information is accumulated.

In step S1901, if the predetermined number of associating information is accumulated, the prediction model learning unit 252 causes the prediction model 260 to learn using the associating information group as the learning data, to build the learned prediction model 260C (step S1902), and store the learned prediction model 260C in the model storage unit 250 (step S1903), and ends the process.

As described above, according to this embodiment, the associating keyword database 220 does not need to be created in advance, and the more the retrieval process is performed, the more the hit rate of the keyword search can be improved.

Each of the embodiments described above may be applied with respect to handwritten paper documents. More particularly, the embodiments may be applied to any paper document as long as it is possible to associate the author's name and the image data of the paper document written by the author.

The present invention is not limited to the specifically disclosed embodiments, and various modifications and variations may be made without departing from the scope of the claims.

This International application is based upon and claims priority to Japanese Patent Application No. 2019-24821 filed on Feb. 14, 2019, the entire contents of which are incorporated herein by reference.

DESCRIPTION OF THE REFERENCE NUMERALS

100 Document retrieval system
200, 200A, 200B, 200C, 200D Document retrieval apparatus
210 Digital document database
220, 220A Associating keyword database
230 Document image database
240, 240A, 240B, 240C, 240D Retrieval processing unit
241 Input reception unit
242 Document acquisition unit
244 Associating keyword acquisition unit
245 Document search unit
246 Search result output unit
247 Selection reception unit
248 Document image output unit
249 Associating keyword update unit
250 Model storage unit
251, 252 Prediction model learning unit
260 Prediction model
260A, 260B, 260C Learned prediction model
300 Terminal device

The invention claimed is:

1. A document retrieval apparatus comprising:
a storage device configured to store a program; and
a processor configured to execute the program, and perform a process including
receiving an input of a keyword;
acquiring an author's name and a document file from a digital document database which stores document files of text data obtained by performing a character recognition process with respect to document image data of handwritten documents, and names of authors who wrote the handwritten documents;
referencing an associating keyword database which stores information associating the authors' names, keywords, and associating keywords, to acquire an associating keyword of the input keyword, from the received input keyword and the acquired author's name;
searching the acquired document file, using the input keyword and the acquired associating keyword; and
outputting a search result of the searching.

2. The document retrieval apparatus as claimed in claim 1, wherein the processor performs the process further including
acquiring and outputting a document file and associated document image data, from a document image database which stores the document image data of the handwritten documents,
wherein the outputting outputs text data including the input keyword or the associating keyword, from the document file, as the search result, and
wherein, when a part of the text data is selected, the acquiring and outputting acquires and outputs document image data associated with a document file including the selected part of the text data.

3. The document retrieval apparatus as claimed in claim 2, wherein
information stored in the associating keyword database includes the associating keyword or a keyword regarded as a search keyword of the fuzzy search, the author's name acquired by the acquiring, the keyword received by the receiving, and a selection number,
and the processor performs the process further including updating the selection number and storing the updated selection number in the associating keyword database, when the part of the text data output as a result of the search using the associating keyword or the fuzzy search is selected from the search result.

4. The document retrieval apparatus as claimed in claim 2, wherein
the searching performs a fuzzy search using each of the input keyword and the associating keyword, and
the outputting includes a result of the fuzzy search in the search result.

5. The document retrieval apparatus as claimed in claim 4, wherein
information stored in the associating keyword database includes the associating keyword or a keyword regarded as a search keyword of the fuzzy search, the author's name acquired by the acquiring, the keyword received by the receiving, and a selection number,
and the processor performs the process further including updating the selection number and storing the updated selection number in the associating keyword database, when the part of the text data output as a result of the search using the associating keyword or the fuzzy search is selected from the search result.

6. The document retrieval apparatus as claimed in claim 1, wherein
the searching performs a fuzzy search using each of the input keyword and the associating keyword, and
the outputting includes a result of the fuzzy search in the search result.

7. The document retrieval apparatus as claimed in claim 3, wherein the processor performs the process further including
causing a prediction model to learn; and
storing the prediction model in the storage device,
wherein the causing causes the prediction model to learn using updated associating information stored by the updating as learning data, and the storage device stores the learned prediction model,
wherein the learned prediction model predicts and outputs the associating keyword when the input keyword and the acquired author's name are input, and
wherein the searching searches the document file acquired by the acquiring, using the input keyword and the predicted associating keyword.

8. The document retrieval apparatus as claimed in claim 7, wherein the processor performs the process further including
holding, when the text data is selected from the search result, associating information associating the keyword generated from the input keyword included in the selected text data, the author's name, and the input keywords, wherein
the causing causes the prediction model to learn using an associating information group, formed by the associating information, as the learning data,
the storage device stores the learned prediction model,
after the learned prediction model is stored in the storage device, the learned prediction model predicts and outputs an associating keyword when the input keyword and the acquired author's name are input, and the searching searches the document file acquired by the acquiring, using the input keyword and the predicted associating keyword.

9. The document retrieval apparatus as claimed in claim 1, wherein the processor performs the process further including causing a prediction model to learn; and storing the prediction model in the storage device, wherein the causing causes the prediction model to learn using the information stored in the associating keyword database as learning data, and the storage device to store the learned prediction model, wherein the learned prediction model predicts and outputs an associating keyword when the input keyword and the acquired author's name are input, and wherein the searching searches the document file acquired by the acquiring, using the input keyword and the predicted associating keyword.

10. The document retrieval apparatus as claimed in claim 1, wherein the associating keyword is a character string including an erroneously recognized character as a result of performing the character recognition process with respect to the keyword associated with the associating keyword.

11. A document retrieval system comprising:

a document retrieval apparatus; and a terminal device, wherein the document retrieval apparatus includes a storage device configured to store a program; and a processor configured to execute the program, and perform a process including receiving an input of a keyword;

acquiring an author's name and a document file from a digital document database which stores document files of text data obtained by performing a character recognition process with respect to document image data of handwritten documents, and names of authors who wrote the handwritten documents;

referencing an associating keyword database which stores information associating the authors' names, keywords, and associating keywords, to acquire an associating keyword of the input keyword, from the received input keyword and the acquired author's name;

searching the acquired document file, using the input keyword and the acquired associating keyword; and outputting a search result of the searching.

12. The document retrieval system as claimed in claim 11, wherein the processor of the document retrieval apparatus performs the process further including acquiring and outputting a document file and associated document image data, from a document image database which stores the document image data of the handwritten documents, wherein the outputting outputs text data including the input keyword or the associating keyword, from the document file, as the search result, and wherein, when a part of the text data is selected, the acquiring and outputting acquires and outputs document image data associated with a document file including the selected part of the text data.

13. The document retrieval system as claimed in claim 12, wherein information stored in the associating keyword database includes the associating keyword or a keyword regarded as a search keyword of the fuzzy search, the author's name acquired by the acquiring, the keyword received by the receiving, and a selection number, and the processor performs the process further including updating the selection number and storing the updated selection number in the associating keyword database, when the part of the text data output as a result of the search using the associating keyword or the fuzzy search is selected from the search result.

14. The document retrieval system as claimed in claim 11, wherein the searching performs a fuzzy search using each of the input keyword and the associating keyword, and the outputting includes a result of the fuzzy search in the search result.

15. A non-transitory computer-readable recording medium having stored therein a document retrieval program which, when executed by a computer, causes the computer to perform a process comprising:

receiving an input of a keyword;

acquiring an author's name and a document file from a digital document database which stores document files of text data obtained by performing a character recognition process with respect to document image data of handwritten documents, and names of authors who wrote the handwritten documents;

referencing an associating keyword database which stores information associating the authors' names, keywords, and associating keywords, to acquire an associating keyword of the input keyword, from the received input keyword and the acquired author's name;

searching the acquired document file, using the input keyword and the acquired associating keyword; and outputting a search result of the searching.

16. The non-transitory computer-readable recording medium as claimed in claim 15, wherein the document retrieval program which, when executed by the computer, causes the computer to perform a process further comprising:

acquiring and outputting a document file and associated document image data, from a document image database which stores the document image data of the handwritten documents, wherein the outputting outputs text data including the input keyword or the associating keyword, from the document file, as the search result, and wherein, when a part of the text data is selected, the acquiring and outputting acquires and outputs document image data associated with a document file including the selected part of the text data.

17. The non-transitory computer-readable recording medium as claimed in claim 15, wherein the searching performs a fuzzy search using each of the input keyword and the associating keyword, and the outputting includes a result of the fuzzy search in the search result.

18. A document retrieval method to be implemented by a computer which performs procedures comprising:

receiving an input of a keyword;

acquiring an author's name and a document file from a digital document database which stores document files of text data obtained by performing a character recognition process with respect to document image data of handwritten documents, and names of authors who wrote the handwritten documents;

referencing an associating keyword database which stores information associating the authors' names, keywords, and associating keywords, to acquire an associating keyword of the input keyword, from the received input keyword and the acquired author's name;

searching the acquired document file, using the input keyword and the acquired associating keyword; and outputting a search result of the searching.

19. The document retrieval method as claimed in claim 18, wherein the computer performs the procedures further comprising:

acquiring and outputting a document file and associated document image data, from a document image database which stores the document image data of the handwritten documents, wherein the outputting outputs text data including the input keyword or the associating keyword, from the document file, as the search result, and wherein, when a part of the text data is selected, the acquiring and outputting acquires and outputs document image data associated with a document file including the selected part of the text data.

20. The document retrieval method as claimed in claim 18, wherein the searching performs a fuzzy search using each of the input keyword and the associating keyword, and the outputting includes a result of the fuzzy search in the search result.

* * * * *